(12) United States Patent
Abu-Ageel

(10) Patent No.: US 7,298,940 B2
(45) Date of Patent: Nov. 20, 2007

(54) ILLUMINATION SYSTEM AND DISPLAY SYSTEM EMPLOYING SAME

(76) Inventor: Nayef M. Abu-Ageel, 45K Rolling Green Dr., Fall River, MA (US) 02720

(*) Notice: Subject to any disclaimer, the term of this patent is extended or adjusted under 35 U.S.C. 154(b) by 0 days.

(21) Appl. No.: 11/317,189

(22) Filed: Dec. 22, 2005

(65) Prior Publication Data

US 2006/0153518 A1    Jul. 13, 2006

Related U.S. Application Data

(63) Continuation-in-part of application No. 11/066,616, filed on Feb. 25, 2005, and a continuation-in-part of application No. 11/067,591, filed on Feb. 25, 2005, and a continuation-in-part of application No. 11/066,605, filed on Feb. 25, 2005, and a continuation-in-part of application No. 10/458,390, filed on Jun. 10, 2003.

(60) Provisional application No. 60/639,925, filed on Dec. 22, 2004.

(51) Int. Cl.
*G02B 6/26* (2006.01)
*G02B 6/42* (2006.01)
*G02B 5/02* (2006.01)
*G02B 5/30* (2006.01)
*G02B 27/28* (2006.01)

(52) U.S. Cl. .................. 385/31; 362/558; 362/583; 359/485; 359/489; 359/501; 385/33; 385/38; 385/39

(58) Field of Classification Search ............... 362/558, 362/583; 359/501, 485, 489; 385/31
See application file for complete search history.

(56) References Cited

U.S. PATENT DOCUMENTS

| | | | | |
|---|---|---|---|---|
| 4,744,615 A * | 5/1988 | Fan et al. | .................. | 385/146 |
| 4,765,718 A | 8/1988 | Henkes | | |
| 5,059,013 A | 10/1991 | Jain | | |
| 5,396,350 A | 3/1995 | Beeson et al. | | |
| 5,829,858 A | 11/1998 | Levis et al. | | |
| 6,332,688 B1 | 12/2001 | Magarill | | |
| 6,517,210 B2 | 2/2003 | Peterson | | |
| 6,587,269 B2 | 7/2003 | Li | | |
| 7,125,120 B2 * | 10/2006 | Aruga | .................. | 353/20 |
| 2003/0021098 A1 * | 1/2003 | Chang | .................. | 362/19 |
| 2003/0086066 A1 * | 5/2003 | Kato | .................. | 353/20 |
| 2005/0002169 A1 * | 1/2005 | Drazic et al. | .................. | 362/19 |

* cited by examiner

*Primary Examiner*—Frank G. Font
*Assistant Examiner*—Ryan Lepisto
(74) *Attorney, Agent, or Firm*—Gavrilovich, Dodd & Lindsey LLP

(57) ABSTRACT

A compact, light weight, efficient and cost-effective illumination system for optical displays is disclosed. The illumination system is capable of producing a self-luminous light beam of selected cross-section and spatial distribution in terms of intensity and angle. The illumination system can efficiently couple light from light sources having wide variety of sizes and shapes into light valves of various shapes and sizes. The illumination system includes a light recovery system or a polarization conversion system or a suitable combination of the foregoing.

20 Claims, 29 Drawing Sheets

ILLUMINATION SYSTEM AND DISPLAY SYSTEM EMPLOYING SAME

CROSS-REFERENCE TO RELATED APPLICATIONS

This application is a continuation-in-part of U.S. patent application Ser. Nos. 10/458,390, filed on Jun. 10, 2003, titled "Light Guide Array, Fabrication Methods, and Optical System Employing Same"; 11/066,616, filed on Feb. 25, 2005, titled "Compact Projection System Including A Light Guide Array"; 11/067,591, filed on Feb. 25, 2005, titled "Light Recycler And Color Display System Including Same"; and 11/066,605, filed on Feb. 25, 2005, titled "Compact Polarization Conversion System for Optical Displays". This application also claims the benefit of U.S. Provisional Application No. 60/639,925 filed on Dec. 22, 2004. The aforementioned applications are hereby incorporated by reference as though set forth in full herein.

TECHNICAL FIELD

The invention relates generally to projection systems utilizing optical apparatuses that convert non-homogeneous light into substantially homogeneous and collimated illumination over predefined areas. More particularly, the disclosure relates to an optical illumination system, e.g., a light recovery system, for delivering uniform and collimated light to an area such as that of a light valve or display panel.

BACKGROUND

Light valves based on liquid crystal display technology and MEMS (micro-electro-mechanical systems) technology have been used in various display applications which include, but are not limited to projectors, projection TVs, camcorders, digital still cameras, internet appliances, cell phones and headsets. To operate, light valves require an illumination system for providing light. The light illuminates the valves, which control how the light is displayed so that viewer can perceive images. Light valves are often microscopic in size, allowing highly detailed images. In most of light valve applications, low cost, compact, light weight illumination systems are desirable. In addition, in such applications, a uniform, bright and stable image is an important characteristic.

FIGS. 1A-1C show cross-sectional views of known projection systems 10, 20 and 220 that include illumination systems utilizing light guide integrators and lens plates in order to provide uniform light to display panels 17, 27 and 227. In FIG. 1A, the input light 13 is focused into the entrance aperture of a straight light guide integrator 14. Light beam 15a exits light guide integrator 14 more uniformly and homogeneously across the exit aperture in terms of spatial light intensity. The exit aperture of light guide integrator 14 is imaged onto the image gate of display panel 17 through a relay lens 16a. A set of lenses may be used to perform the function of relay lens 16a and collimate the light beam 15a. The light beam which passes through a transmissive display panel 17 (FIG. 1A) or gets reflected by a reflective display panel (not shown) is focused by a field lens 16b into the aperture of a projection lens 18, which in turn projects the image displayed on the display panel 17 onto a screen 19. Where projection systems 10, 20 and 220 utilize liquid crystal display (LCD) panels, polarizers and analyzers are usually inserted before and after display panels 17, 27 and 227, in addition to the components shown in FIGS. 1A-C.

The light guide 14 can be straight 14a as shown in FIG. 1D, tapered 14b as shown in FIG. 1E, asymmetrical 14c, as shown in FIG. 1F, or hexagonal 14d, as shown in FIG. 1G. In addition, the light guides 14a, 14b, 14c and 14d can be solid glass rods with polished surfaces, or alternatively, hollow tunnels with reflective surfaces. The light enters the entrance aperture 1, 3 and 6 and emerges from the exit aperture 2, 4 and 7 more uniformly after experiencing multiple reflections, as in case of hollow light tunnels, or multiple total internal reflections, as in case of solid light rods. The light uniformity at the exit aperture increases with an increase in light guide 14a, 14b, 14c and 14d length L.

As shown in FIG. 1D, the entrance 1 and exit 2 apertures of straight light guide 14a have equal $W_1 \times W_2$ cross-sectional areas. Tapered light guides 14b of FIG. 1E deliver uniform and more collimated light in comparison with straight light guides of FIG. 1D. A tapered light guide 14b usually has unequal cross-sectional areas of its entrance $A_1$ and exit $A_2$ apertures. Entrance 3 and exit 4 apertures can have unequal sizes and similar aperture shapes such as square, rectangular or circular as well as unequal sizes and different aperture shapes. Such light guides have been described in U.S. Pat. No. 6,332,688, of Magarill and U.S. Pat. No. 4,765,718, of Henkes, which are hereby incorporated by reference.

Asymmetrical light guides 14c of FIG. 1F are used to compensate for Keystone distortion, illumination overfill regions, and illumination drop-off regions. Asymmetrical light guides have been described in U.S. Pat. No. 6,517,210, of Peterson and U.S. Pat. No. 5,059,013, of Kantilal Jain, both of which are hereby incorporated by reference. The light guide described in the '013 patent places a quartz diffuser 8 with a thickness $t_d$ at the exit aperture 7 of a hexagonal light guide 14d, as shown in FIG. 1G, in order to convert light emerging from the light guide exit aperture into self-luminous light (i.e., each point over the light beam cross section emits light in a selected range of directions or numerical aperture). Disadvantages of projection system that uses a diffuser at the exit aperture of a light guide are lack of compactness as well as the difficulty of controlling the direction and/or shape of diffused light with most of available diffusers, thus, leading to inefficient light coupling and reduced brightness. In general, known projection systems 10 which utilize light guides 14a, 14b, 14c and 14d to homogenize light suffer from lack of compactness and light losses due to lack of control over the numerical aperture of output light.

In FIGS. 1B-1C, the parabolic 21 and 221 mirror is used to collimate the light emitted by the light source 22 and 222. Lens arrays 23 and 223 divide the substantially collimated input light beam 24a and 224a into sub-beams 24b and 224b. Condenser lenses 25a and 225 focus, in a superimposing manner, the light output from each micro-lens onto the display panel 27 and 227, and in that the width/height ratio of each lens in lens arrays 23a, 23b and 223 corresponds to the width/height ratio of the display panel cross-section in the xy-plane. The light beams which pass through a transmissive display panel 27 and 227 (FIGS. 1B-1C) or get reflected by a reflective display panel (not shown) are focused by field lenses 25*b* and 228 into the apertures of projection lenses 28 and 229, which in turn project the image displayed on the display panels 27 and 227 onto screens 29 and 230. In projection system 20 of FIG. 1B, two separate lens arrays 23*a* and 23*b* are used rather than a single lens array 223 (FIG. 1C). Lens array 223 typically has large number of small-size lenses when compared to lens array 23*a* and 23*b*, which requires more precise alignment of lenses on both sides of lens array 223, thus, resulting in difficult manufacturing and more expensive lens arrays 223. Disadvantages of projection systems 20 and 220 include lack of compactness, need for alignment of both plates 23*a* and 23*b* and difficulty to control the cone angle distribution (i.e., numerical aperture) of output light 24*b* and 224*b* over light valve area, limited light coupling and limited display brightness.

Known projection systems and light integrating technologies suffer from inefficiency in light coupling between components and a lack of compactness. Therefore, there is a need for a compact, light weight, efficient and cost-effective illumination system that provides improved control over spatial distribution of light in terms of intensity and angle over a specific area, such as the active area of a display panel or light valve. Such an illumination system would enable projection systems with smaller light valves arrays, leading to more compact and less expensive projection systems.

SUMMARY

It is an advantage of the present invention to provide a compact, light weight, efficient and cost-effective illumination system capable of producing a self-luminous light beam of selected cross-section and spatial distribution in terms of intensity and angle. It is a further advantage of the present invention to provide an illumination system that can efficiently couple light from sources having wide variety of sizes and shapes into light valves of various shapes and sizes.

In accordance with the exemplary embodiments of the invention, which are described in the drawings and detailed description that follows, the improved illumination system includes a light recovery system, a polarization conversion system, or a suitable combination of the foregoing. Among other things, these novel components of the illumination system serve to produce the desired self-luminous light beam.

In addition to the embodiments described below, other embodiments, features, aspects, advantages, systems and methods of the invention will be or will become apparent to one with skill in the art upon examination of the following drawings and detailed description. It is intended that all such additional embodiments, features and advantages be included within this description, be within the scope of the invention, and be protected by the accompanying claims.

BRIEF DESCRIPTION OF THE DRAWINGS

It is to be understood that the drawings are solely for purposes of illustration and not as a definition of the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

Figure 1A:
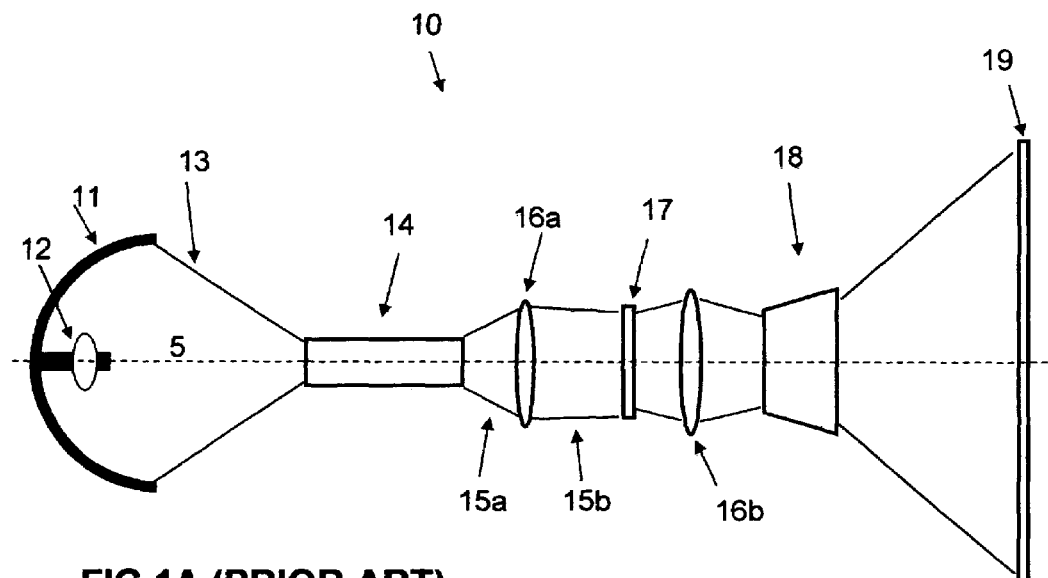
FIG. 1A shows a cross-sectional view of a prior art projection system that utilizes a light guide to provide uniform light distribution.

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

FIGS. 2A-2D show cross-sectional views of exemplary projection systems 30, 50, 80, and 100 that use transmissive display panels 37 and 58, such as liquid crystal display (LCD) panels as well as reflective panels 67 and 108. Examples of reflective panels include reflective LCOS (liquid crystal on silicon) panels and DMD (digital micro mirror) panels. The projection systems 30, 50, 80 and 100 each include illumination systems that comprise a light source 12 housed in an elliptical 11 mirror, light recovery system 34 and 440, relay lenses 36 and 56, 66 and 106. The projection systems also include display panels 37, 58, 67 and 108. When an LCD panel is used in projection systems 30, 50, 80 and 100, two additional components, a polarizer and an analyzer, need to be inserted before and after the LCD panel, respectively. In projection systems 30, 50, 80 and 100, light sources housed in parabolic mirrors or other type of mirrors can also be used instead of light source 12 housed in elliptical mirrors 11.

The light source 12 can be any suitable light emitting device having an output intensity and wavelength suitable for the application in which the system is being used. Examples of light sources include incandescent bulbs, LEDs, lasers, arc lights and the like, as well as sources that emit electromagnetic radiation outside of the visible spectrum.

As shown in FIG. 2A-2D, the input light 33 is focused into the entrance aperture of light recovery system 34 and 440. Light beam 35 exits light recovery system 34 and 440 more uniform and homogeneous across the exit aperture in terms of light intensity, color and view angle. The exit aperture of light recovery system 34 and 440 is imaged onto the image gate (entry face) of light valves (display panels) 37, 58, 67 and 108 through lenses 36, 56, 66 and 106. The light beam which passes through the light valves 37 and 58 is focused by a field lens 38 and 59 into the aperture of projection lenses 39, 60, 69 and 109 which in turn projects the image displayed on the light valve 37, 58, 67 and 108 onto a screen 40, 61, 70 and 110. In projection system 80 and 100 of FIGS. 2C-2D, the image displayed on the light valve 67 and 108 is projected onto the screen 70 and 110 through projection lenses 69 and 109 without using a field lens.

Figure 1D:
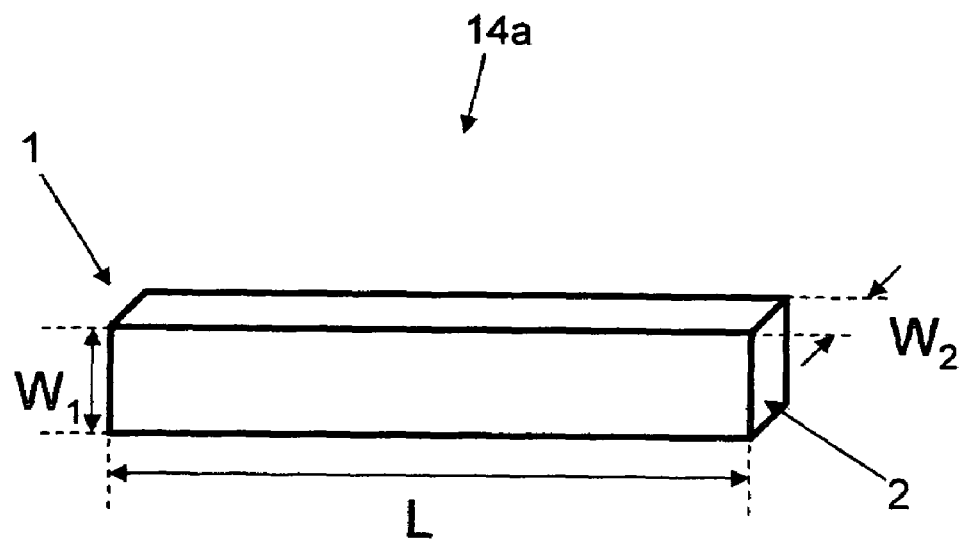
FIG. 1D shows a perspective view of a prior art straight light guide.
Figure 1E:
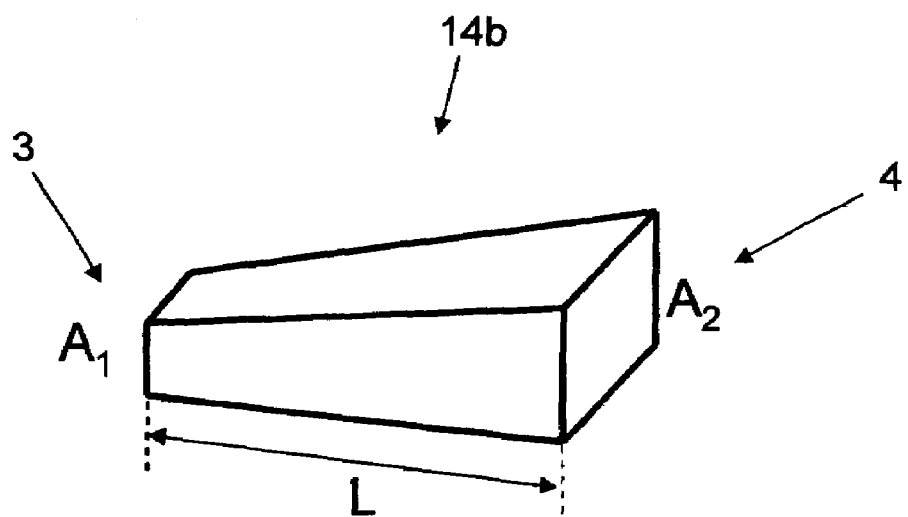
FIG. 1E shows a perspective view of a prior art tapered light.
Figure 1F:
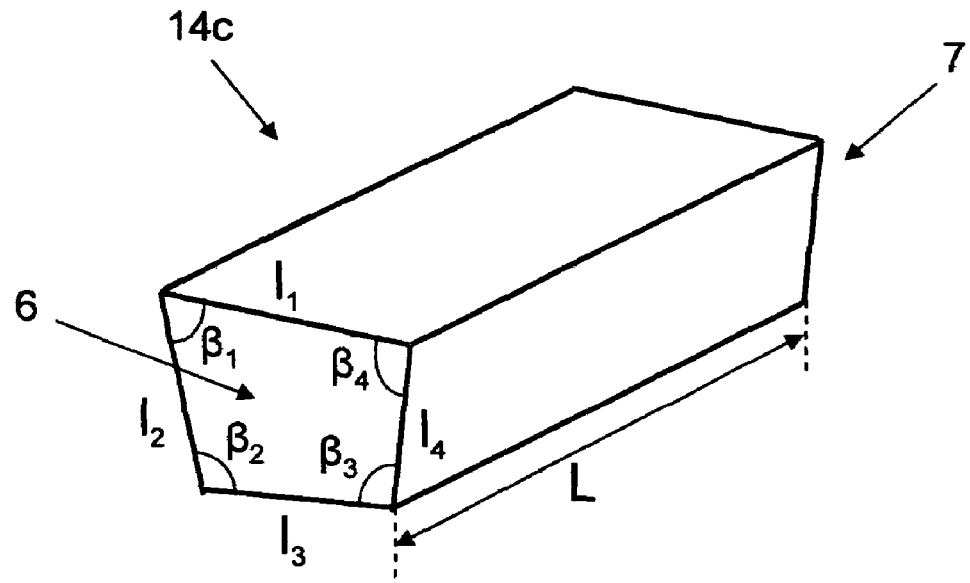
FIG. 1F shows a perspective view of a prior art asymmetrical light guide.
Figure 1G:
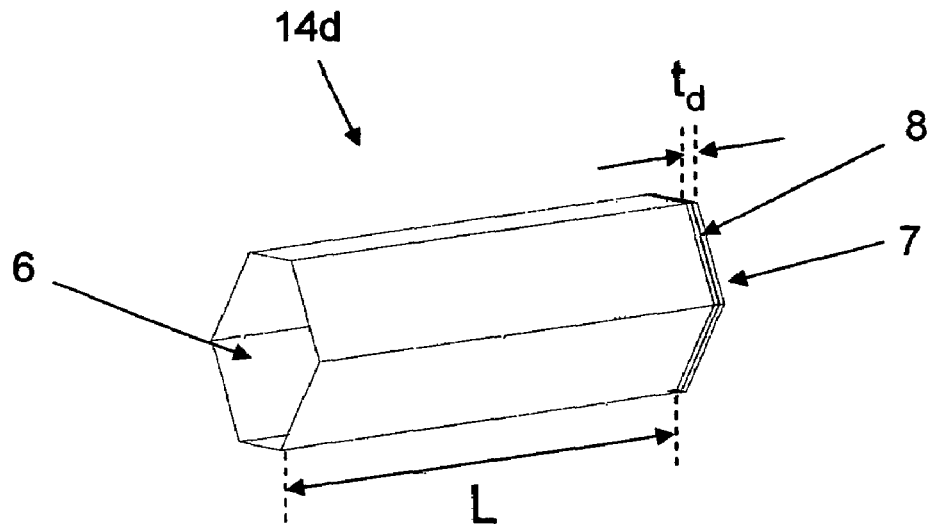
FIG. 1G shows a perspective view of a prior art hexagonal light with a diffuser attached to its exit aperture.
Figure 2A:
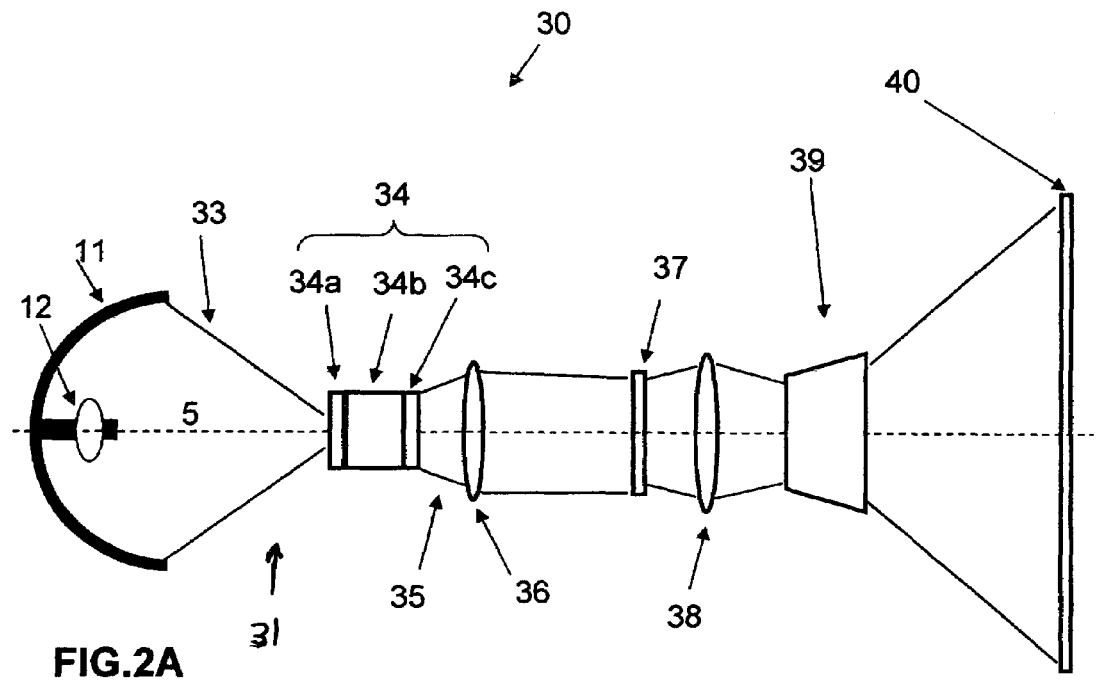
FIG. 2A shows a cross-sectional view of a projection system utilizing a light recovery system to provide uniform light distribution to a transmissive display panel.
Figure 2B:
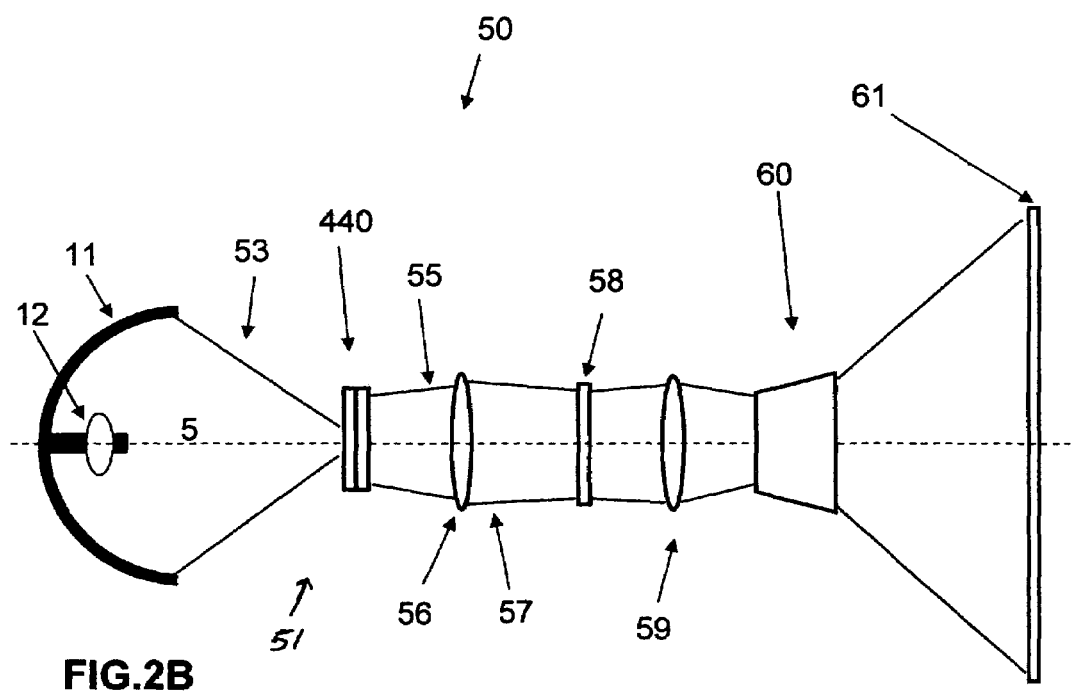
FIG. 2B shows a cross-sectional view of a projection system utilizing a compact light recovery system to provide uniform light distribution to a transmissive display panel.
Figure 2C:
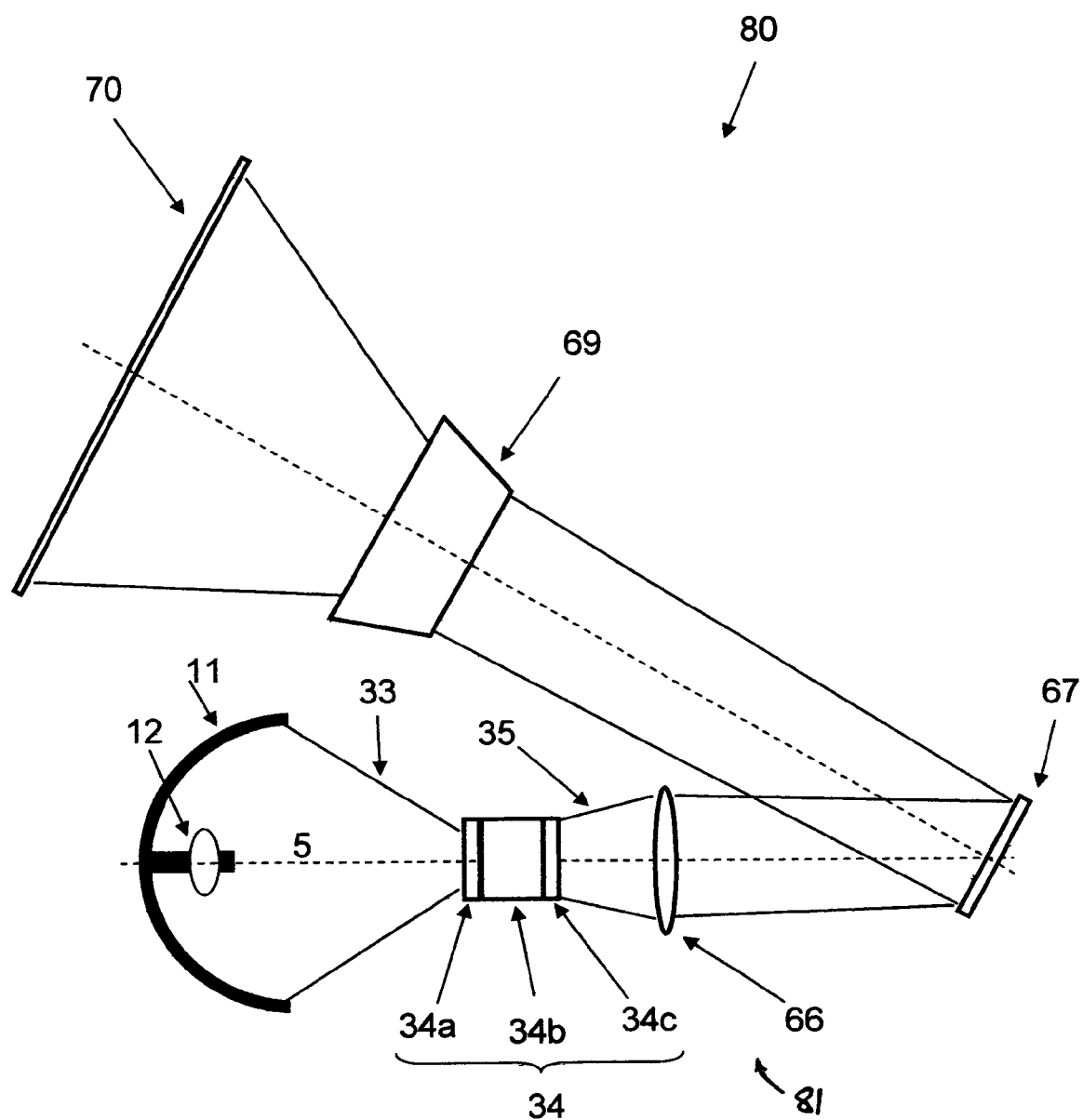
FIG. 2C shows a cross-sectional view of a projection system utilizing a light recovery system to provide uniform light distribution to a reflective display panel.
Figure 2D:
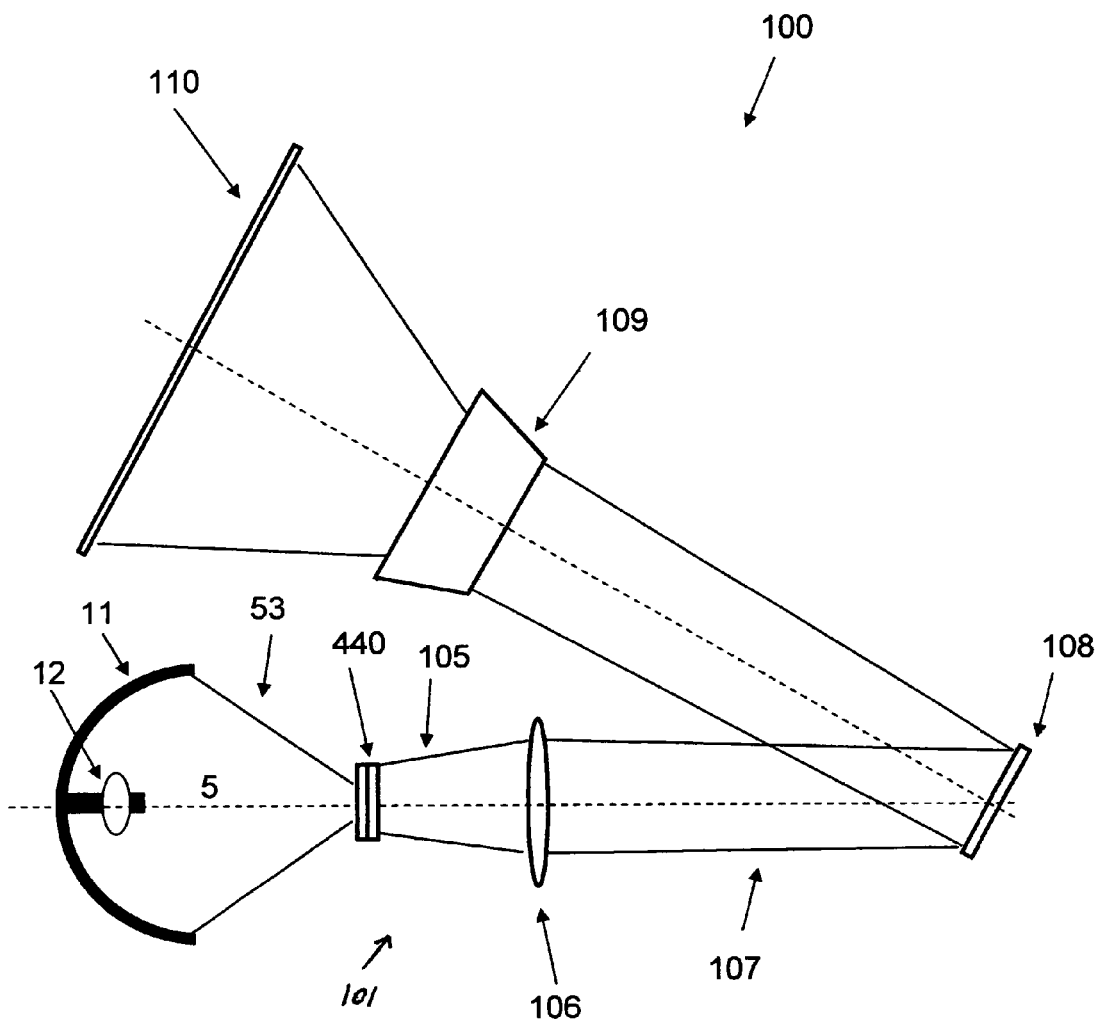
FIG. 2D shows a cross-sectional view of a projection system utilizing a compact light recovery system to provide uniform light distribution to a reflective display panel.
Figure 2E:
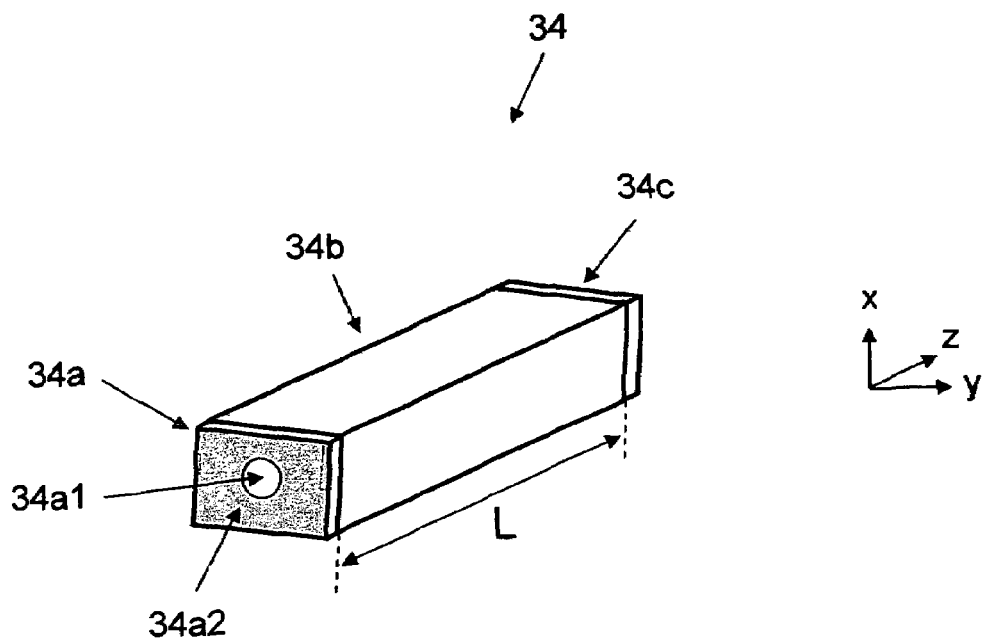
FIG. 2E shows a perspective view of an assembled polarization recovery system.
Figure 2F:
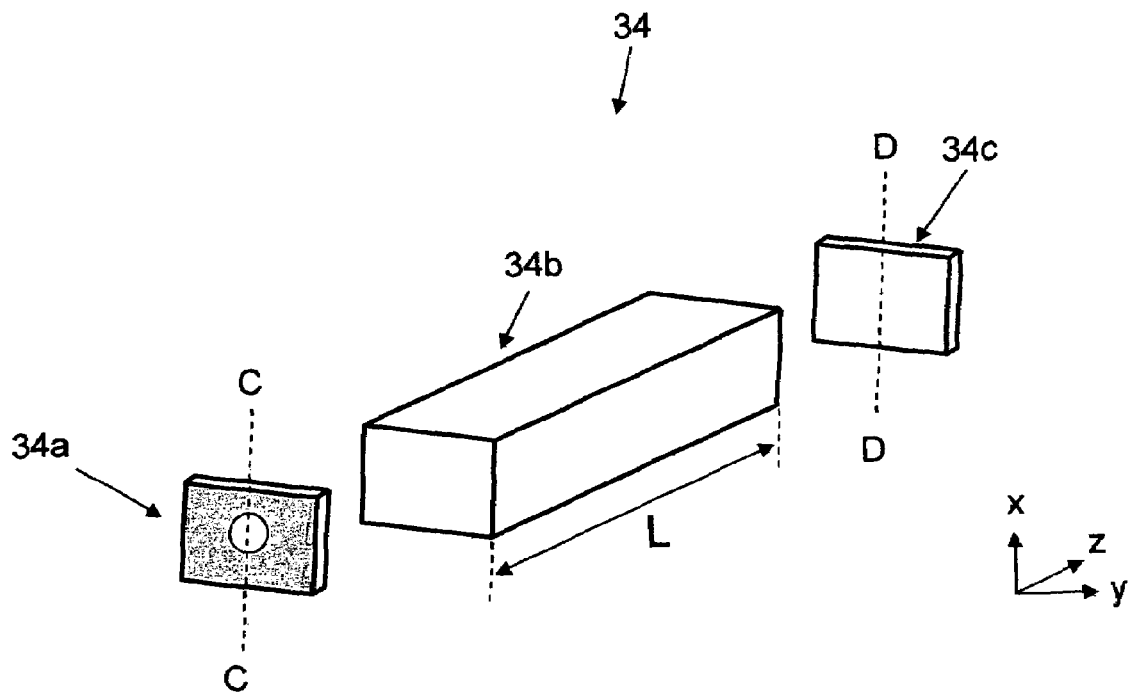
FIG. 2F shows a perspective view of the components that form polarization recovery system of FIG. 2E.

Light recovery system 34 includes a reflective plate 34a, a light guide 34b and a micro-guide plate 34c, as shown in FIG. 2E. These components are attached together with a thin layer of an optical adhesive which can be applied to the whole or part of the surface areas of plates 34a and 34c. Subsequently, plates 34a and 34c are bonded to both sides of light guide 34b and finally the adhesive is cured. Perspective views of the light recovery system 34 after and before the assembly are shown in FIG. 2E and FIG. 2F, respectively. Light guide 34b can be solid light guide made of optically transmissive material such as glass with polished surfaces or hollow light guide with reflective sidewalls and can also be straight (FIG. 1D) or tapered (FIG. 1E) light guide. Length of light guide ranges from few millimeters to tens of millimeters depending on the size of its entrance and exit apertures, cone angle of light propagating within the light guide 34b and degree of desired light uniformity. The entrance and exit apertures of light guide 34b are independent in terms of size and shape and can have different sizes and different shapes such as square, rectangular, circular, trapezoidal, polygonal, asymmetrical and even irregular shapes. Asymmetrical light guides 14c such as nonrectangular and trapezoidal guides as shown in FIG. 1F can be used in the light recovery system 34 to compensate for Keystone distortion, illumination overfill regions, and illumination drop-off regions, which occur when the display panel is tilted obliquely from the optical path 5 as shown in FIG. 2C. Thus, the use of asymmetrical light guides results in reducing light loss, increasing brightness, and enhancing brightness uniformity across the display panel surface area. Design parameters of asymmetrical light guides 14c include light guide length L, lengths $l_1$, $l_2$, $l_3$ and $l_4$ of input aperture and those of exit aperture, as well as angles $\beta_1$, $\beta_2$, $\beta_3$ and $\beta_4$ of input aperture and those of exit aperture. Cross-sectional areas (in the xy-plane of FIGS. 2E-2F) of plates 34a and 34c are preferably made to match the shapes and sizes of the entrance and exit apertures of light guide 34b, respectively.

Keystone distortion, illumination overfill regions, and illumination drop-off regions can be corrected by using rectangular light recovery systems 34, 440 rather than asymmetrical light guide systems. In this case, micro-guide plates 34c and 440c are designed to compensate for Keystone distortion, illumination overfill regions, and illumination drop-off regions. The design parameters of micro-elements that can be altered within micro-guide plates 34c and 440c to compensate include size of micro-elements (entrance aperture, exit aperture and length), shape of micro-elements entrance and exit apertures (square, rectangular, circular, trapezoidal, asymmetrical and irregular shapes), taper of sidewalls along micro-element length, orientation of each micro-element with respect to the micro-guide array, and distribution of micro-elements over the micro-guide plate surface area. Since micro-guide plates 34c and 440c are fabricated with IC like process, it is much easier and less expensive to use these micro-guide plates 34c and 440c to compensate for Keystone distortion, illumination overfill regions, and illumination drop-off regions. A light recovery system using this compensation approach has the advantage of using simpler and less expensive rectangular components, rather than more complex asymmetrical light guides.

The operation of the light recovery system 34 is described as follows. The light beam 33 is received first by the input plate 34a and enters the light guide 34b through the plate's aperture 34a1 as shown in FIG. 2E. Light mixes as it travels within the light guide 34b and becomes more uniform. Light uniformity at the exit aperture of the light guide increases with the increasing number of light reflections within the light guide 34b. Some of the light leaving light guide 34b enters micro-guide plate 34c through the entrance apertures 134 of the micro-guides 139 (FIGS. 2G-2I), which in turn reduce the cone angle of the received light beam. The remainder of the light beam strikes the reflective coating 138 (FIGS. 2G-2I) and gets reflected back toward plate 34a. Part of this light traveling in the opposite direction (i.e., in the negative z direction) passes through aperture 34a1 (FIG. 2E) of plate 34a and exits toward the light source. A substantial amount of this light strikes the reflective coating 34a2 (FIG. 2E) of plate 34a and gets reflected back toward plate 34c. This process continues until a large amount of the light exits through plate 34c and the remainder exits through aperture 34a1 or gets absorbed by the reflective coatings within the light recovery system. As the cone angle of the light beam exiting micro-guide plate 34c decreases, more light can be utilized by the display panel and projection lens resulting in a more efficient projection system.

Figure 2G:
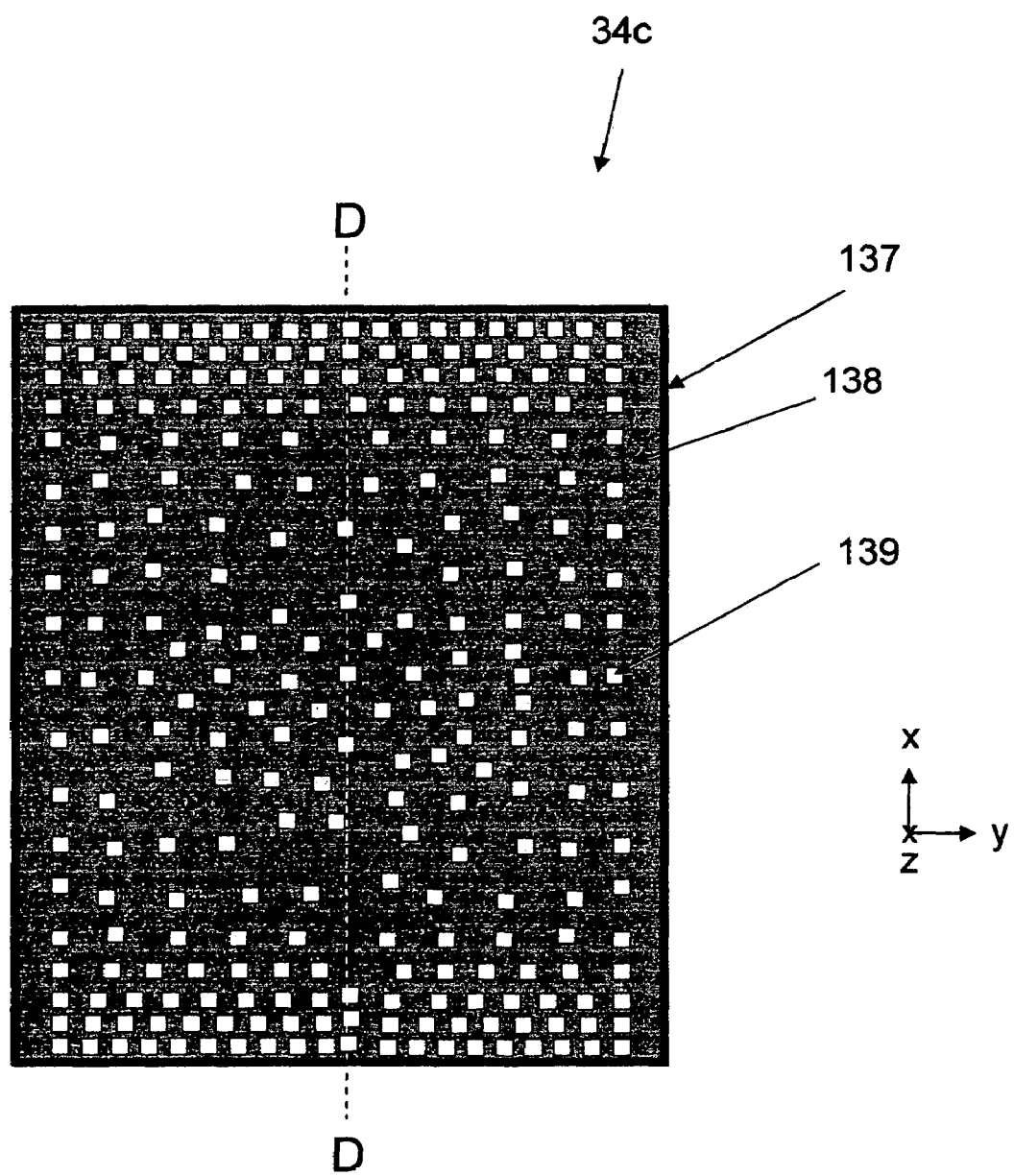
FIG. 2G shows a front view of a micro-guide array 34*c* of FIG. 2E.

FIG. 2G shows an example of a collimating micro-guide plate 34c. The micro-guide plate 39 includes one or more optical elements. The optical elements (i.e., micro-elements) are formed and positioned in a specific arrangement for altering at least one optical characteristic of the input light to produce desired characteristics in the output light. The optical elements can include any suitable combination of micro-guides, micro-tunnels, micro-lenses, micro-prisms or the like.

Figure 2H:
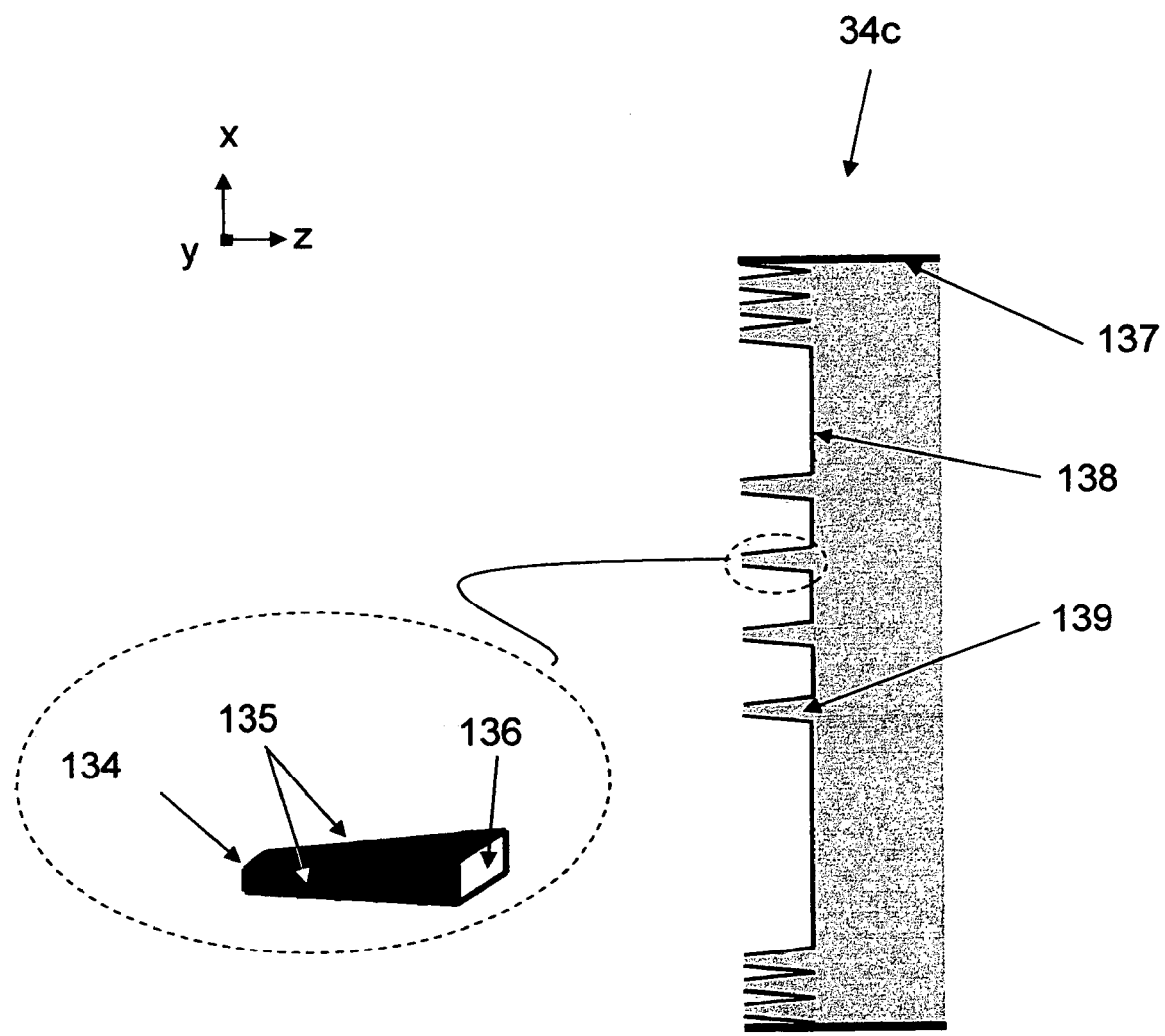
FIG. 2H shows cross-sectional view of a micro-guide array 34*c* of FIG. 2G along line D.
Figure 2I:
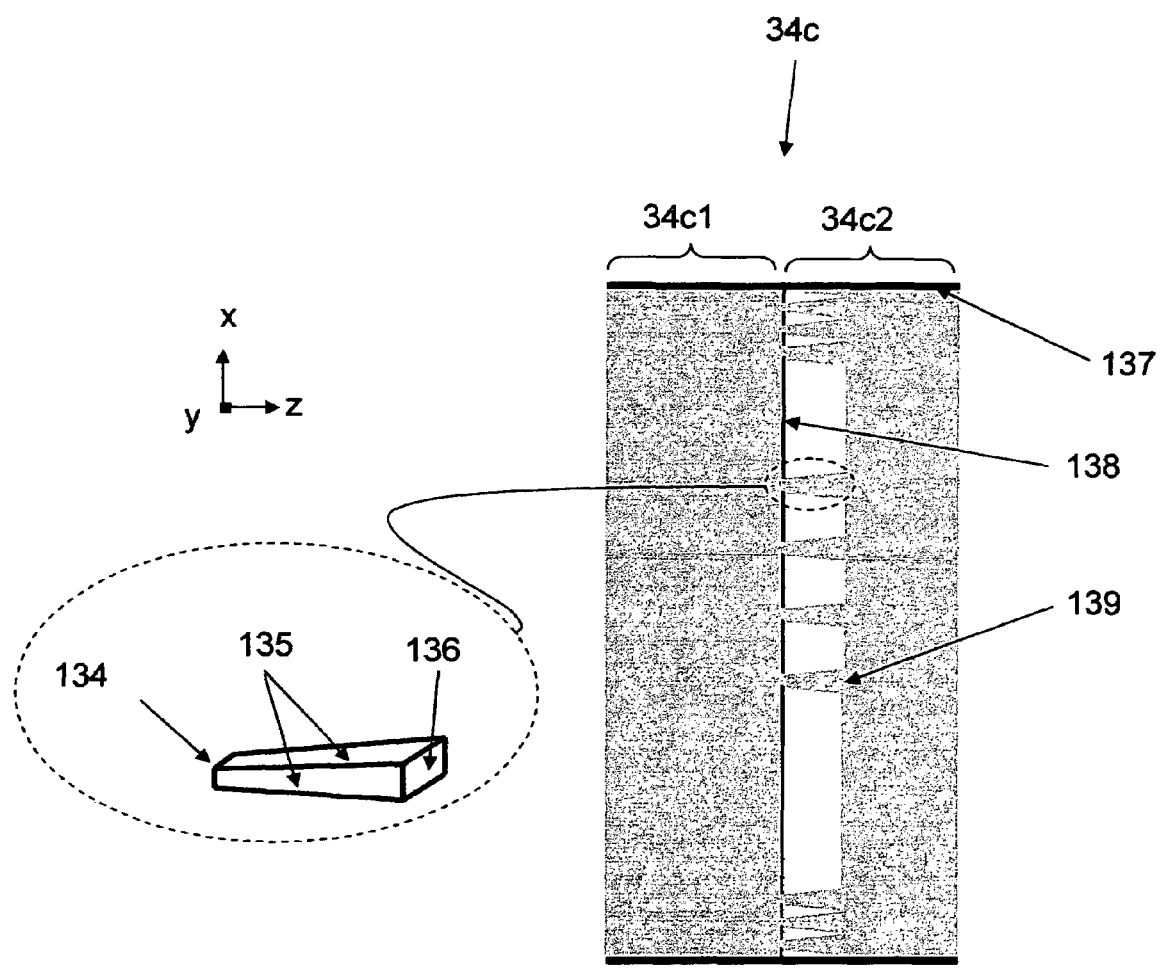
FIG. 2I shows cross-sectional view of a different implementation of micro-guide array 34*c* of FIG. 2G along line D.

In the example shown in FIG. 2G, the plate 34c includes a distribution of micro-guides 139. The distribution of the micro-guides 139 over the surface of the plate 34c can be uniform, non-uniform or random. The non-uniform distribution of the micro-guides 139 can be used to shorten the length of the light guide 34b while maintaining a desired spatial light distribution at the exit aperture of plate 34c. In addition to controlling the micro-guide distribution, the size and shape of the input aperture 134 of each micro-guide 139 (FIG. 2H) can be designed so that a selected spatial light intensity across the surface of plate 34c is delivered to the next stage. Controlling the sidewall 135 tilt angle, permits control over the light angular distribution across the surface of plate 34c. The reflective coating 138 can be applied to the micro-guide sidewalls 135 as shown in FIG. 2H. It is possible to utilize total internal reflection phenomenon within the micro-guides by applying the reflective coating 138 as shown in FIG. 2I. In this case, plate 34c includes two plates 34c1 and 34c2.

Figure 3A:
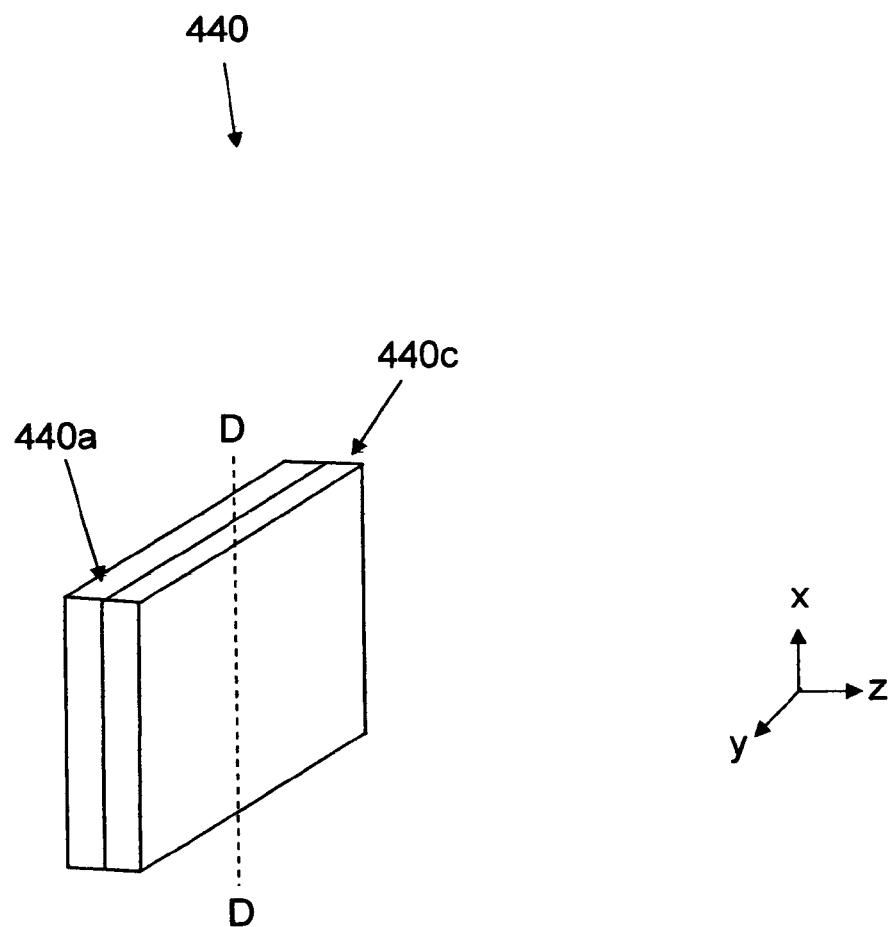
FIG. 3A shows a perspective view of a compact light recovery system.
Figure 3B:
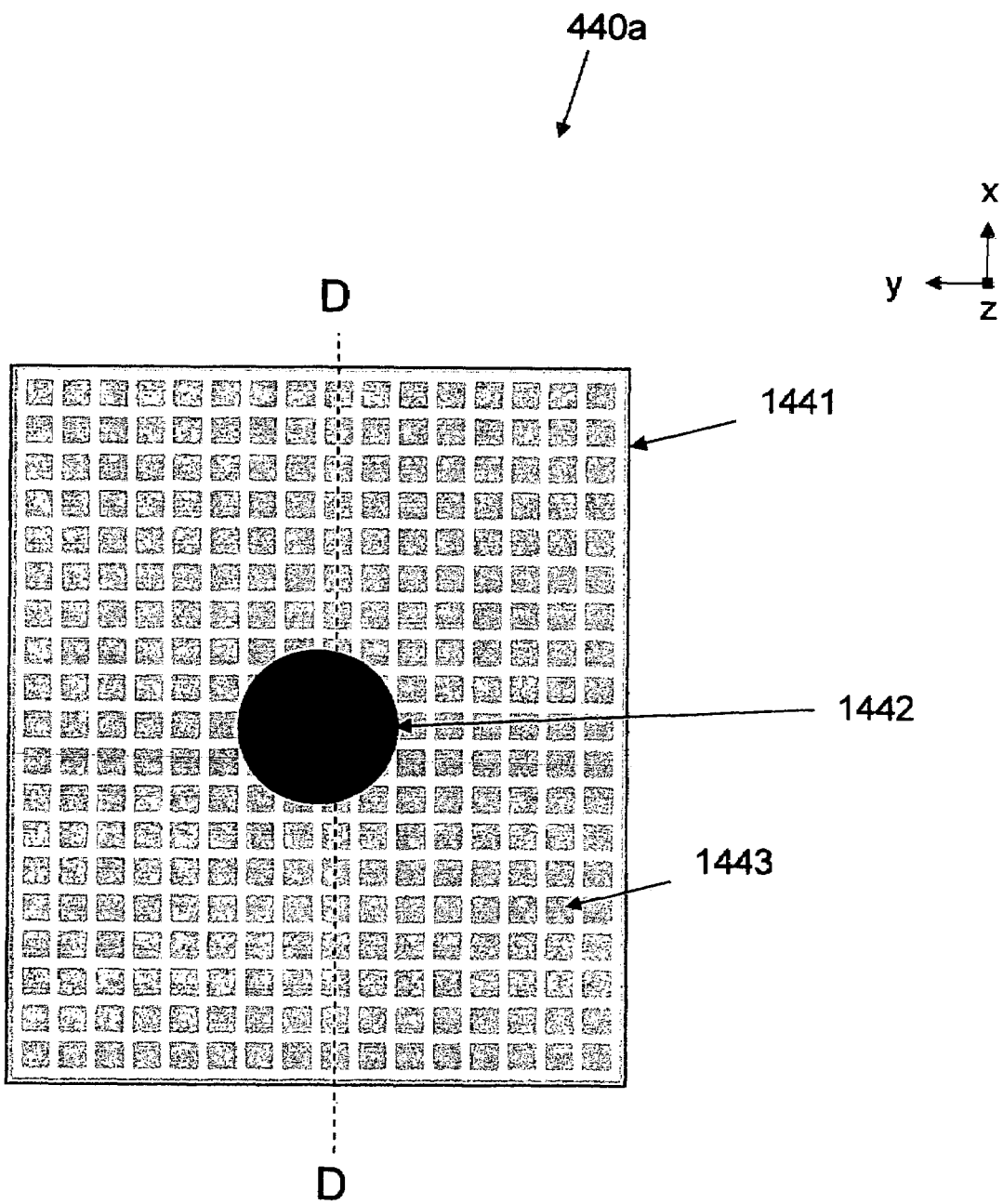
FIG. 3B shows a back view of a plate 440*a* of FIG. 3A.
Figure 3C:
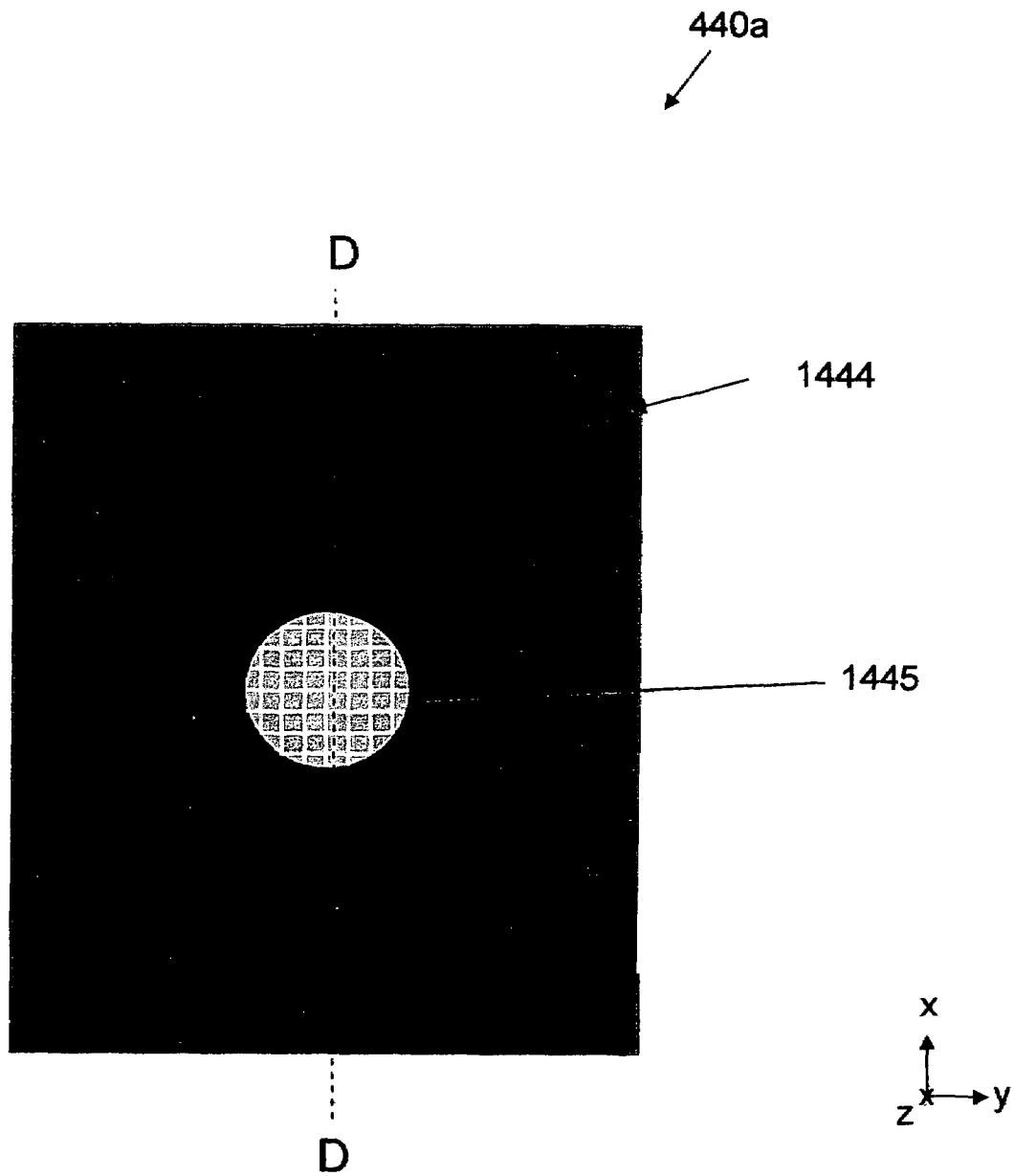
FIG. 3C shows a front view of a plate 440*a* of FIG. 3A.
Figure 3D:
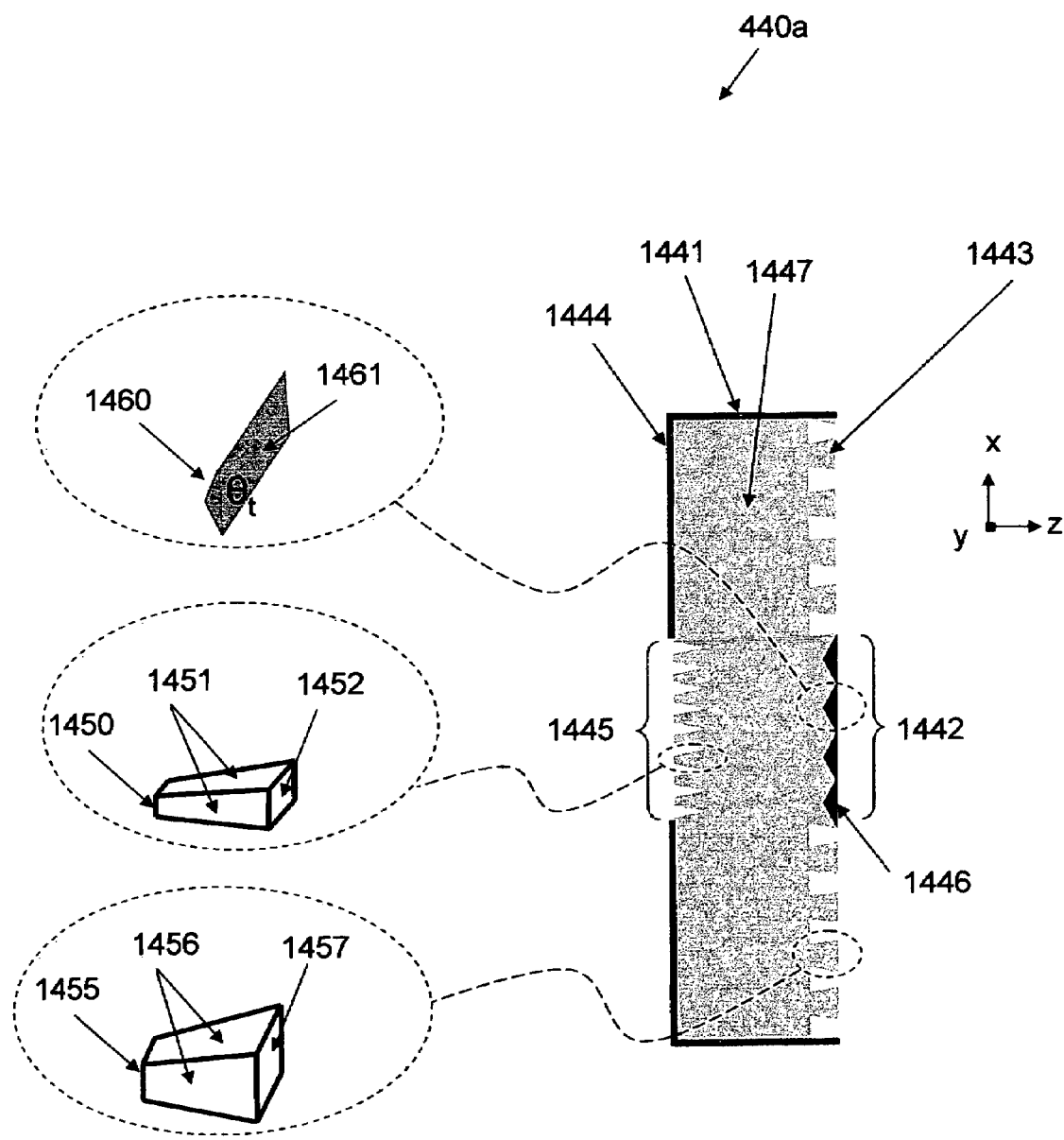
FIG. 3D shows cross-sectional view of plate 440*a* of FIGS. 3B-3C along line D.

A compact light recovery system 440 can be made using two plates 440a and 440c and without a light guide 34b, as shown in FIG. 3A. An example of plate 440a is shown in FIGS. 3B-3D. FIGS. 3B and 3C show back and front views of plate 440a. The front side of the plate 440a faces the light source. FIG. 3D shows a cross-sectional view of FIGS. 3B and 3C along section line D. Plate 34c of FIGS. 2H-2I can be used to perform the function of plate 440c.

The light recovery systems 34 and 440 typically have the same cross section (in the xy-plane) aspect ratio as the display panel used in the projection system.

Figure 3E:
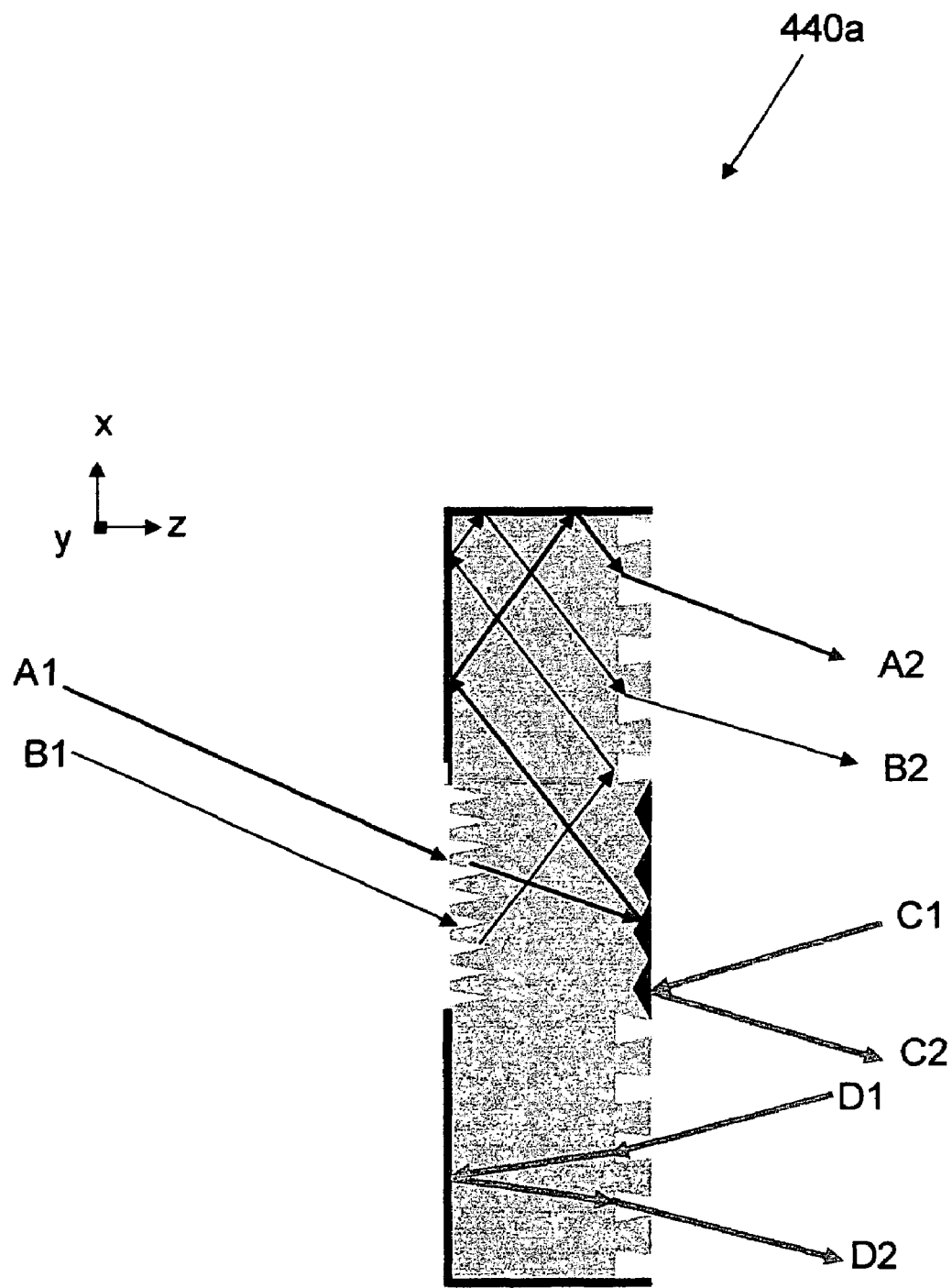
FIG. 3E shows the operation of plate 440*a* as a unidirectional aperture.
Figure 3F:
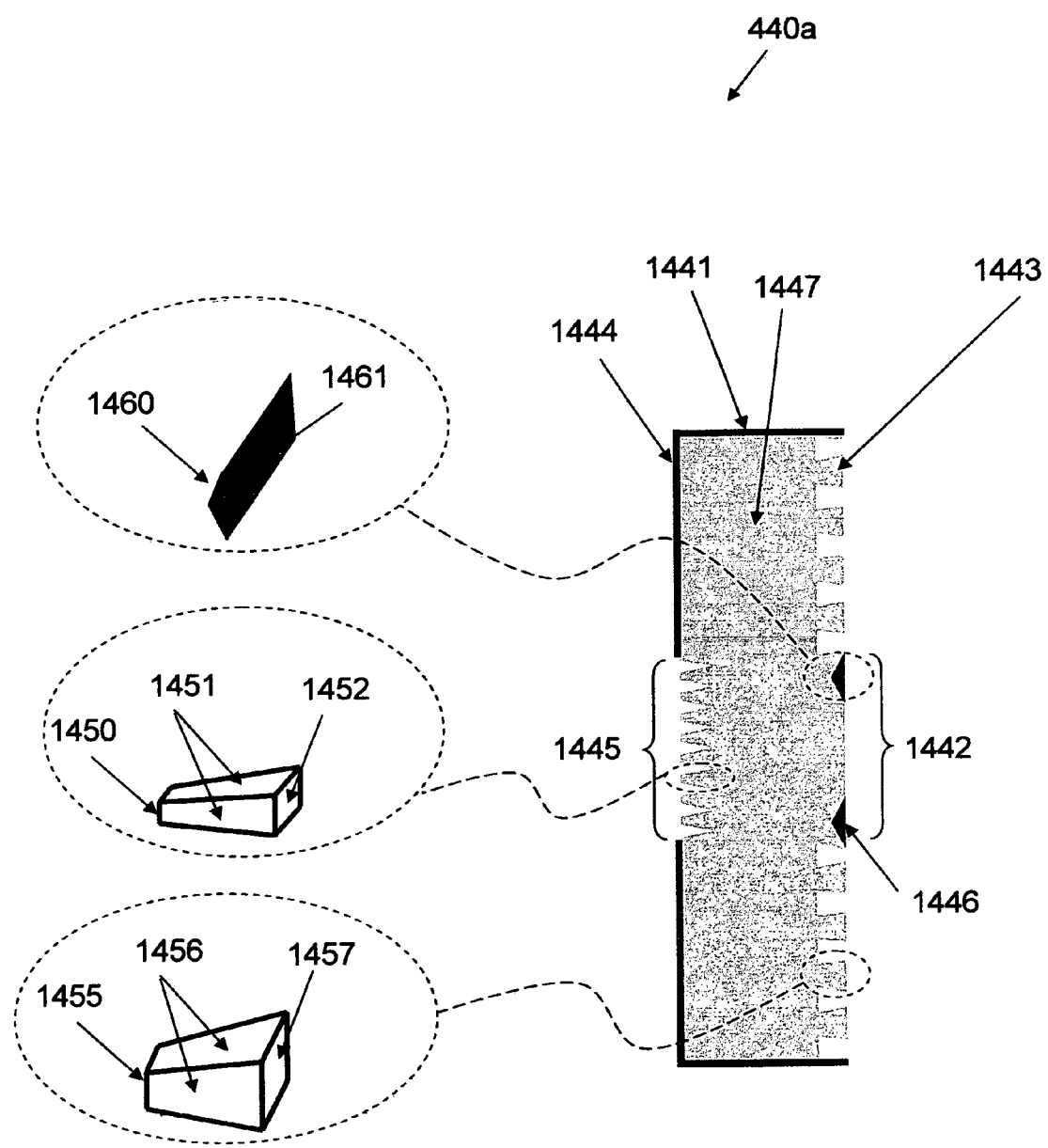
FIGS. 3F-3G show two different implementations of plate 440*a*.
Figure 3G:
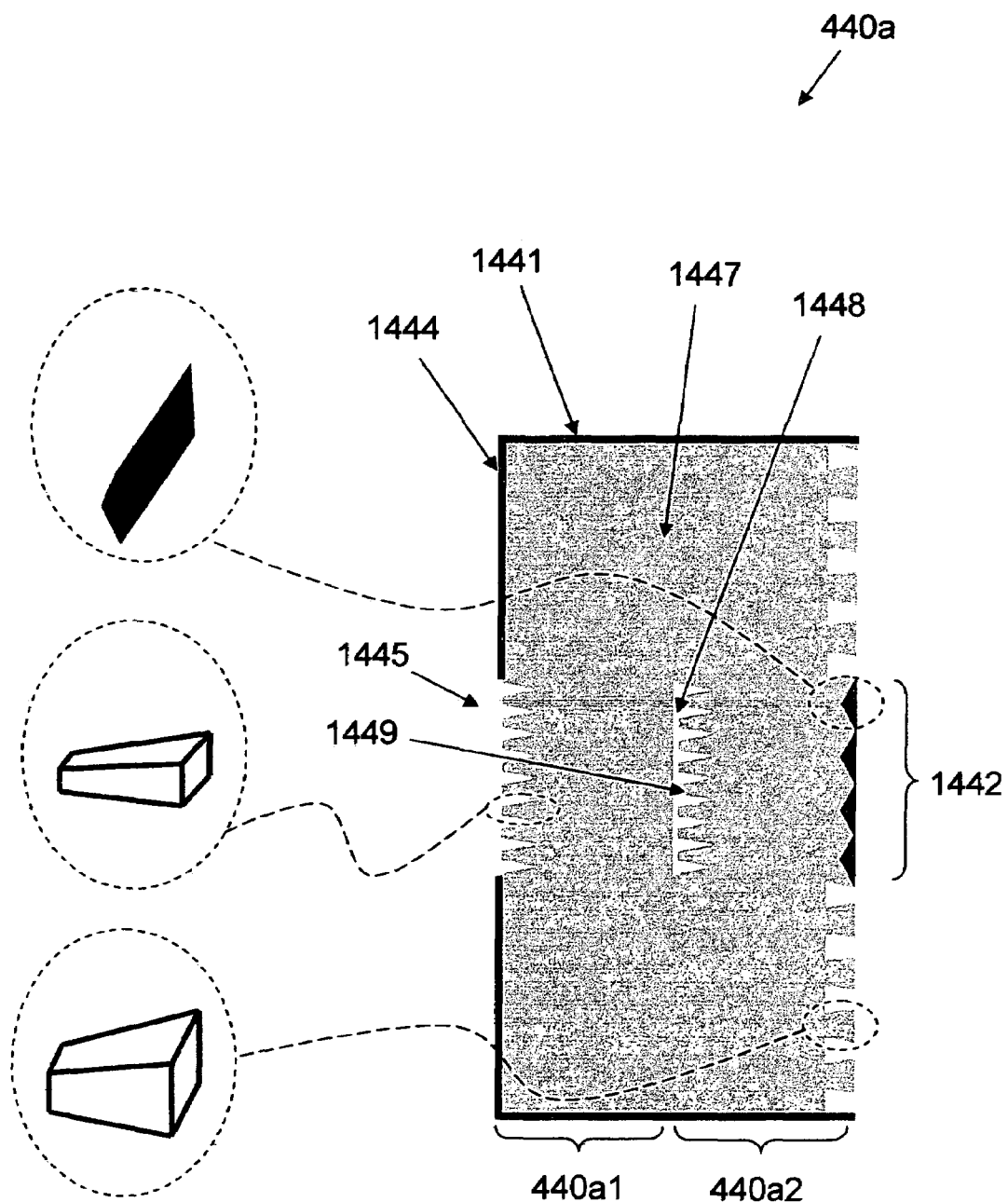

The operation of the light recovery system 440 is explained as follows. The light beam 53 (FIGS. 2B and 2D) is received first by the input micro-guide array 1445, which converts the angle of the light that strikes the micro-guide sidewalls 1451 (e.g., ray B1 of FIG. 3E) into 50°±10° with respect to the optical axis (z-axis). This light continues toward array 1443 without striking array 1442, assuming that the thickness of plate 440a is made large enough, and eventually exits (e.g., ray B2 of FIG. 3E) through the micro-guide sidewalls 1456 (FIG. 3D) of array 1443 with a range of angles close to those of the input beam 53. The remainder of the input light 53 enters through the micro-guides entrance apertures 1450 (e.g., ray A1 of FIG. 3E) and gets a certain amount of collimation depending on the micro-guide sidewall 1451 tilt angle. This light continues toward array 1442, which reflects the incoming light toward the reflective surface 1444 and away from the input micro-guide array 1445 by changing its angle into 50°±10°. This light eventually exits (e.g., ray A2 of FIG. 3E) through the micro-guide sidewalls 1456 of array 1443 with a range of angles close to those of the input beam 53. Array 1442 has a large number (several hundreds to millions) of micro-guides with a tilt angle $\theta_t$ that permits reflecting incident light into 50°±10° range. The micro-guides within array 1442 can be one-dimensional or two-dimensional, which are typically made in the plate 440a and coated with a highly reflective coating 1446. As shown in FIG. 3E, light with a cone angle comparable to that of input beam 53 (e.g., rays C1 and D1) that strikes plate 440a in the opposite direction (−z direction) gets reflected back (e.g., rays C2 and D2) in the forward direction (+z direction). Light that strikes the micro-guide sidewall 1456 as it travels in the −z direction changes its angle into 50°±10° range, enters the plate's body, recycles within the plate's body and eventually exits in the +z direction through the micro-guide sidewall 1456 at an angle comparable to its incident angle. Light that strikes the micro-guide sidewall 1456 as it travels in the +z direction (i.e., light reflected by the reflective coating 1444 toward array 1443) experiences total internal reflection (TIR) and eventually exits in the +z direction through the micro-guide exit aperture 1457 at an angle comparable to its incident angle. Since a substantial amount of the light that strikes plate 440a in the −z direction gets reflected back in the forward direction (+z direction), plate 440a acts as a unidirectional aperture that passes light in one direction, the +z direction. This kind of plate 440a can be used in many applications such as conventional polarization conversion system (e.g., EP 1 315 022 A1 to Valter Drazic) and conventional recapture light guides used in sequential color display systems (e.g., EP 1 098 536 A2 to Scott Dewald et al.) to enhance their optical efficiencies. FIGS. 3F-3G show other implementations of plate 440*a*. FIG. 3F shows the use of array 1442 with a smaller area when compared to that of FIGS. 3B-3D, which reflects part of the received light beam from array 1445 into the 50°±10° range while the remainder of the light passes toward the next stage. It is also possible to reduce the area of array 1442 to zero and allow the collimated light received from array 1445 to pass toward the next stage unmodified while array 1443 converts light received at 50°±10° into its original cone angle (i.e., cone angle before entering array 1445) then delivers it to next stage.

FIG. 3G shows the use of two serial input arrays 1445 and 1449. Each array converts part of the received light into the 50°±10° range. The remainder of the light beam gets reflected into the 50°±10° range by array 1442. An optional air gap 1448 separates the micro-guides of array 1449 from the body of plate 440*a*1. This optional air gap does not allow the light traveling within the body of plate 440*a*1 at 50°±10° to exit through array 1449. The micro-guide sidewall tilt angle of arrays 1443, 1445, and 1449 can be similar or different and preferably ranges from zero to several degrees. The zero degree tilt angle corresponds to straight sidewalls with no taper.

The size of the entrance/exit aperture of each micro-guide within plates 34*c*, 440*a*, 440*c* and 534*a* and arrays 1442, 1443, 1445, and 1449 is preferably ≧5 μm in case of visible light in order to avoid light diffraction phenomenon. However, it is possible to design micro-elements with sizes of entrance/exit aperture being <5 μm. In such case, the design should consider the diffraction phenomenon and behavior of light at such scales to provide homogeneous light distributions in terms of intensity, viewing angle and color over a certain area. Micro-guides can be arranged as a one-dimensional array, two-dimensional array, circular arrays and can be aligned or oriented individually.

The micro-guide arrays disclosed herein are only a subset of possible micro-guide arrays that can be used. Some other micro-elements, array types and configurations that are usable in the systems disclosed herein are discussed in greater detail in related application Ser. No. 10/458,390 filed on Jun. 10, 2003 and application Ser. No. 11/066,616 filed on Feb. 25, 2005, both to Nayef Abu-Ageel.

Figure 1B:
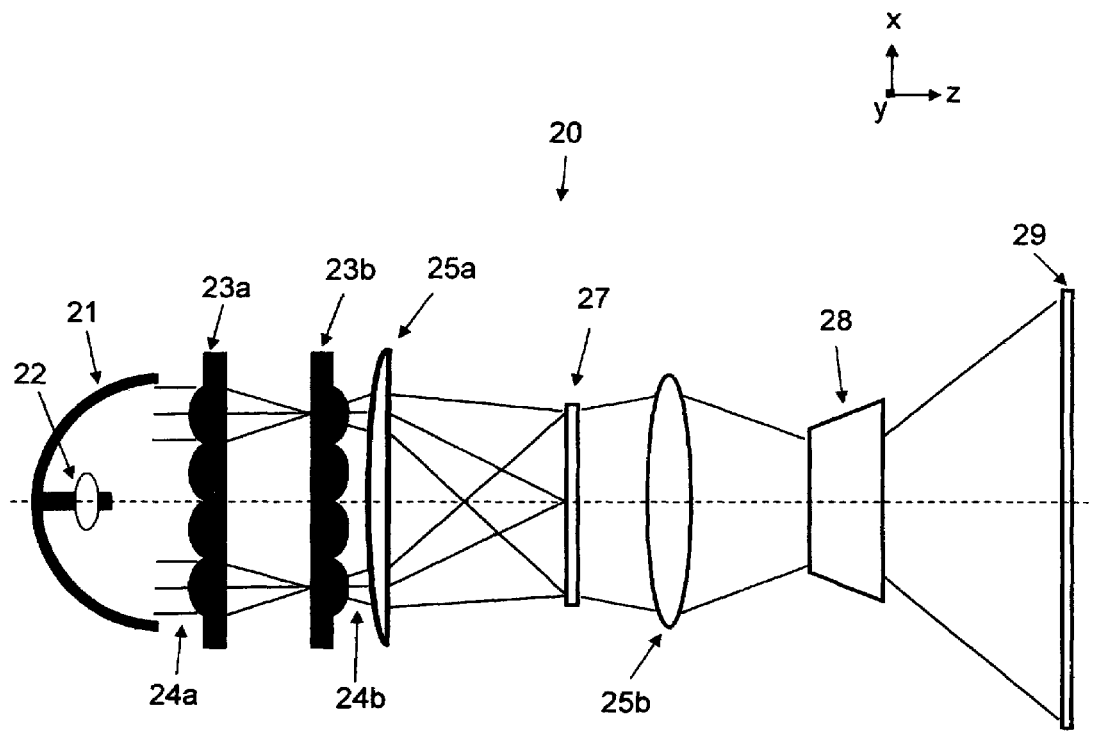
FIG. 1B shows a cross-sectional view of a prior art projection system that utilizes two lens-array plates to provide uniform light distribution.
Figure 1C:
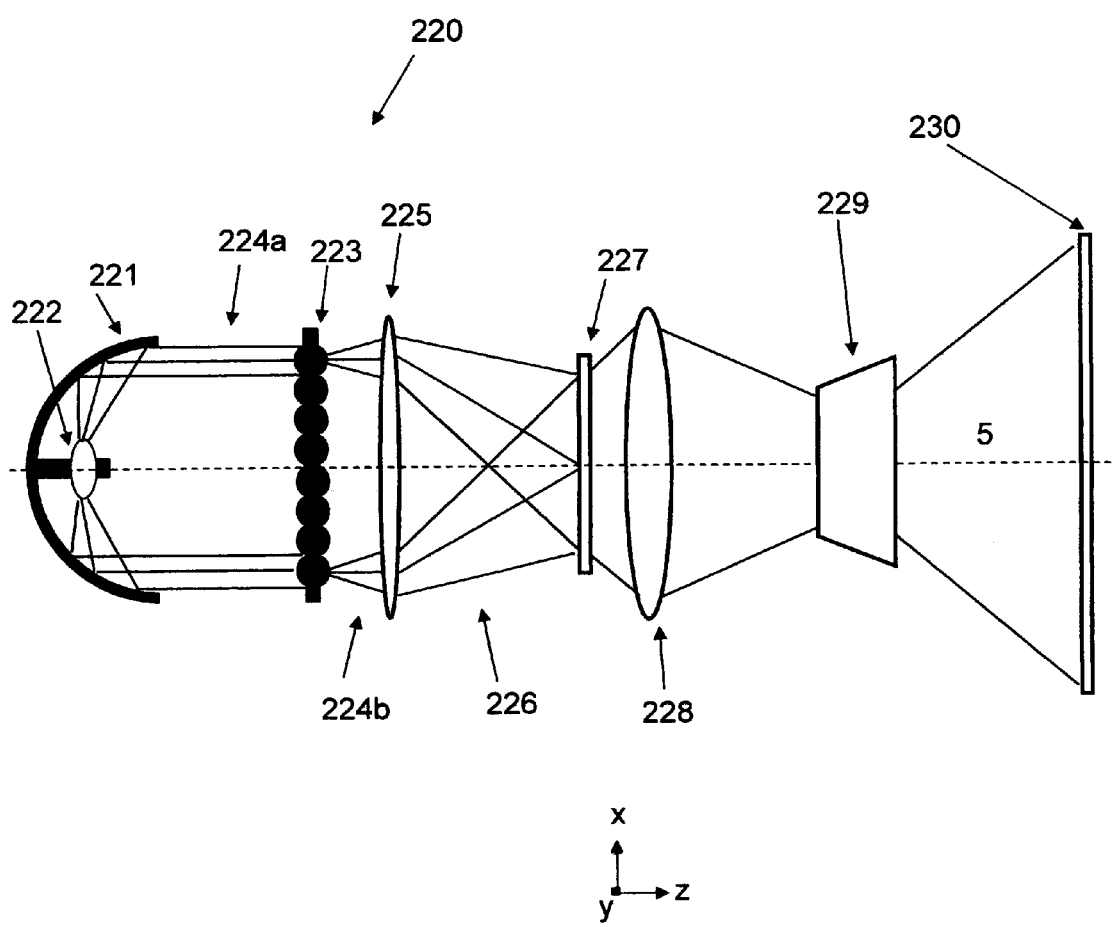
FIG. 1C shows a cross-sectional view of a prior art projection that utilizes a single lens-array plate to provide uniform light distribution.

The light recovery systems 34 and 440 (FIG. 2E and FIG. 3A) have at least four advantages over known light integrators such as solid and hollow light guide (FIGS. 1A, 1D, 1E, 1F and 1G) and fly's eye lens integrators (FIG. 1B-1C).

First, the light recovery systems 34 and 440 provide higher compactness due to the use of the micro-guide array 34*c* at the exit aperture of a solid or hollow light guide 34*b* (FIG. 2E) and the use of arrays 34*c* and 440*b* without light guide 34*b* (FIG. 3A). The micro-guide array 34*c* reflects part of the light beam toward the input aperture 34*a* and 440*a* leading to doubling its path which allows reducing the light guide 34*b* by half. In addition, array 34*c* can be designed so that even shorter light guides 34*b* are used while maintaining the desired spatial light distribution at the exit aperture of the system 34. This design can be achieved through a non-uniform distribution of the micro-guides 139 within plate 34*c* and/or through controlling the size of the entrance aperture 134 of each micro-guide.

Second, the light recovery systems 34 and 440 can provide a higher level of light uniformity due to the large number of virtual sources formed by plates 34*a*, 34*c*, 440*a* and 440*c* as well as light guide 34*b*. Images of these virtual sources are superimposed on top of each other forming an extremely uniform distribution of light at the exit aperture of the light recovery systems 34 and 440.

Third, a higher coupling efficiency between the light source and the display panel (light valve) can be provided by the light recovery systems 34 and 440, resulting in more efficient use of light by the display panel. The enhanced coupling efficiency is achieved by lowering the cone angle population of the light beam delivered to the display panel.

Fourth, the light recovery systems 34 and 440 provide self-luminous light across their exit apertures, which is required by some applications. Self luminance of light means that each point across the exit apertures of light recovery systems 34 and 440 (i.e., exit apertures of micro-guide array 34*c* and 440*c*) emits light into a selected numerical aperture of emission. The distribution of the numerical aperture across the exit apertures of light recovery systems 34 and 440 can be uniform or non-uniform. It is possible to design each point across the exit apertures of light recovery systems 34 and 440 to have its own numerical aperture of emission which is independent of numerical apertures of other points. The diameter of each point is preferably 5 microns or more to avoid light diffraction effects.

Figure 4A:
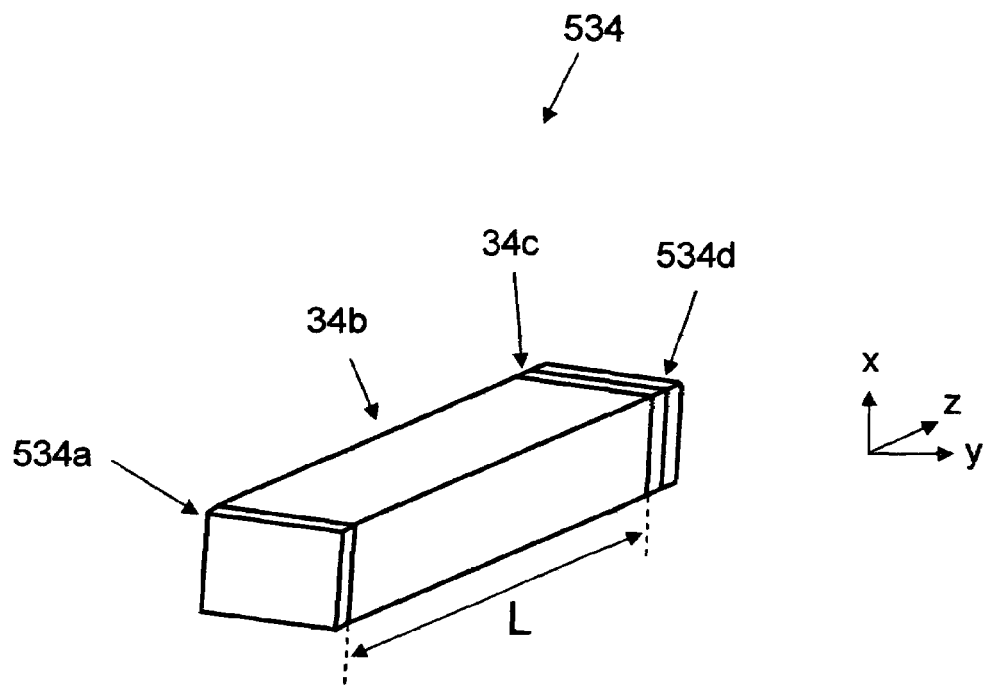
FIGS. 4A-4B show perspective views of two different implementations of a polarization recovery system without using a retardation plate.
Figure 4B:
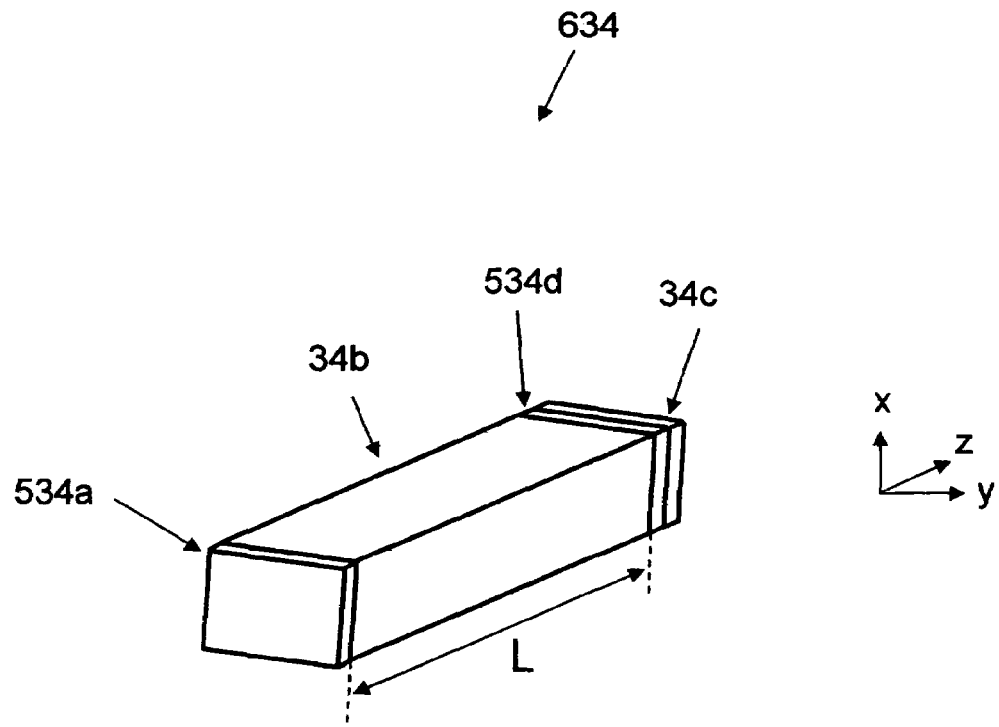

FIGS. 4A-B illustrate polarization conversion systems 534 and 634, respectively, in which no wave plates are needed to convert the polarization of recycled light. In these systems 534,634, micro-elements and micro-guide arrays can be designed and aligned to rotate the polarization state of light beam.

The systems 534 and 634 include an input plate 534*a*, a light guide 34*b*, an optional collimating plate 34*c* and a reflective polarizer 534*d* such as a Proflux™ brand from Moxtek company. Plate 34*c* can be removed without impacting the polarization conversion function, but keeping the plate 34*c* in the systems 534,634 reduces the light cone angle and enhances the optical efficiency of a projection system.

Polarization systems 534 and 634 have the same implementation except for switching the locations of plate 34*c* and reflective polarizer 534*d*. Plate 440*a* of FIGS. 3B-3G can be used to perform the function of plate 534*a* in polarization systems 534 and 634, as long as the orientation and/or shape of the micro-guides within array 1443 are adjusted so that the polarization of the light that passes through them is altered.

Figure 4C:
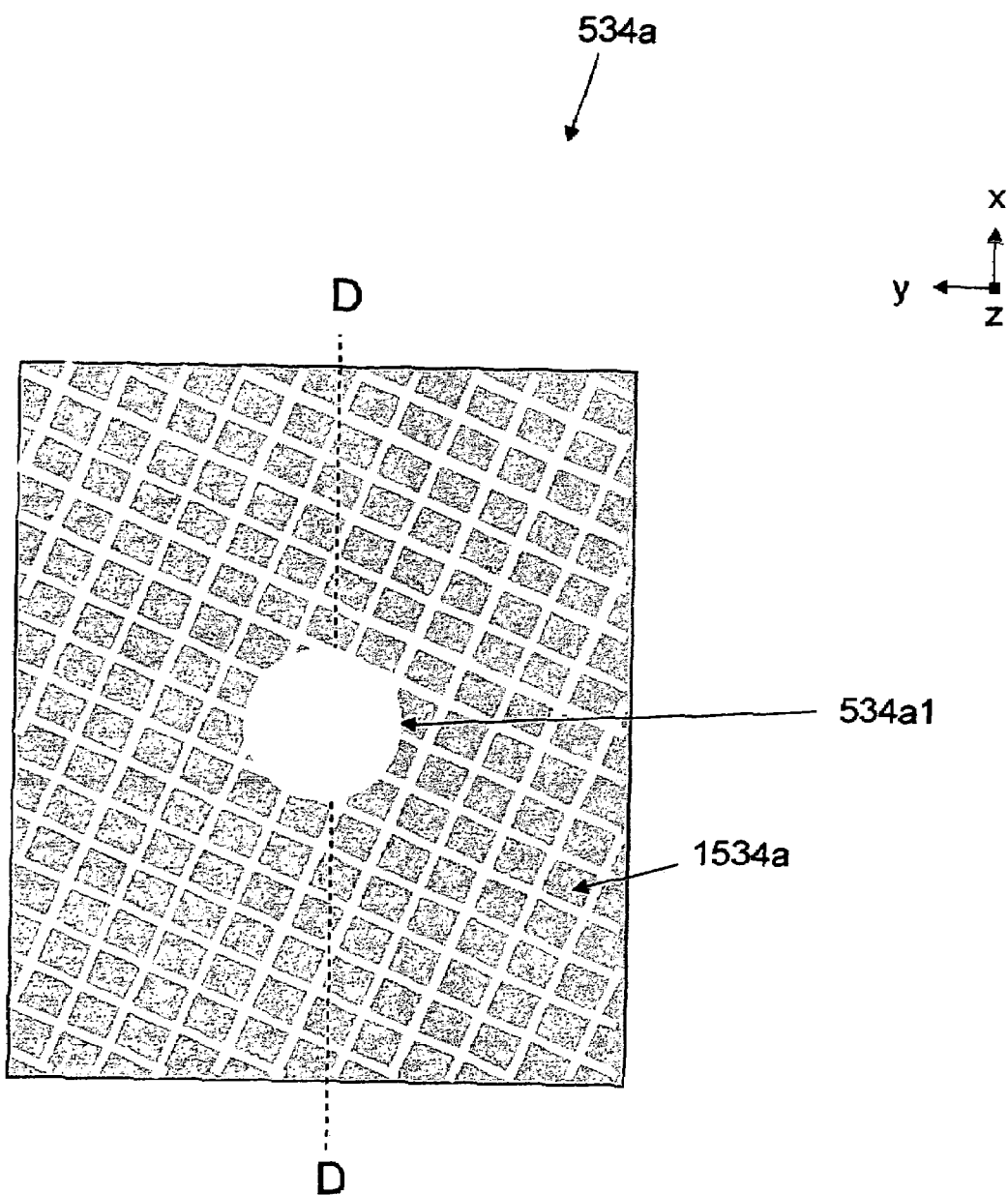
FIG. 4C shows a back side view of a plate 534a of FIG. 3A.
Figure 4D:
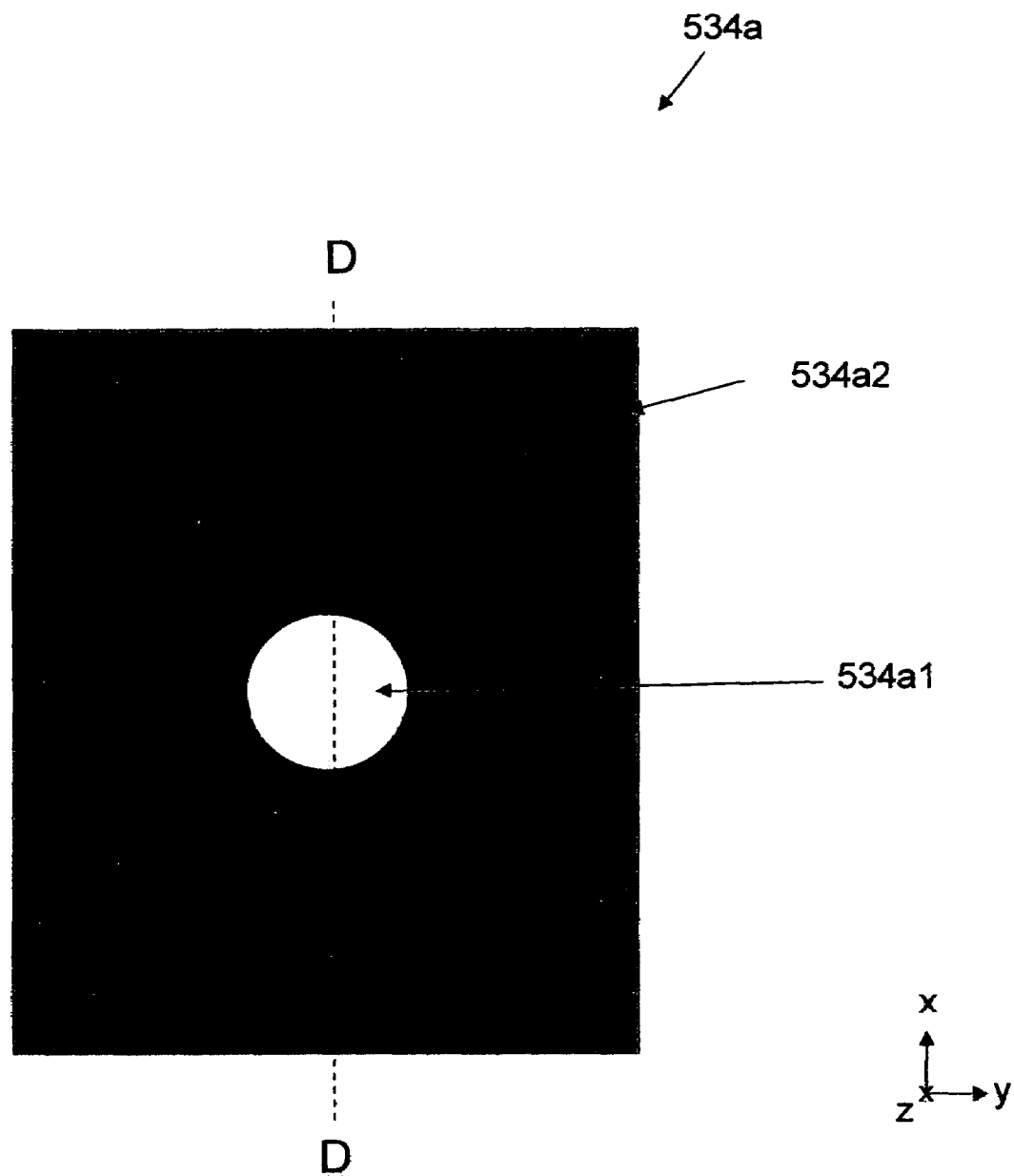
FIG. 4D shows a front side view of a plate 534a of FIG. 3A.
Figure 4E:
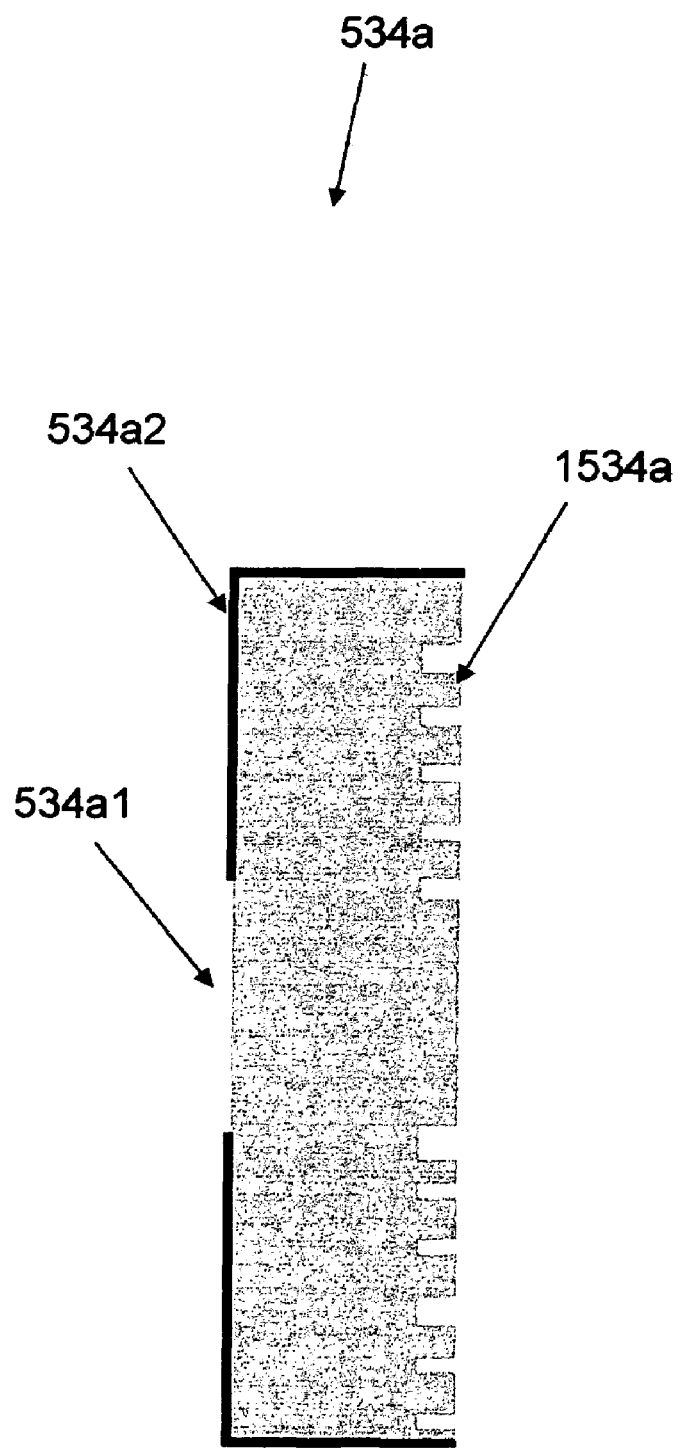
FIG. 4E shows cross-sectional view of plate 534a of FIGS. 4C-4D along line D.
Figure 4F:
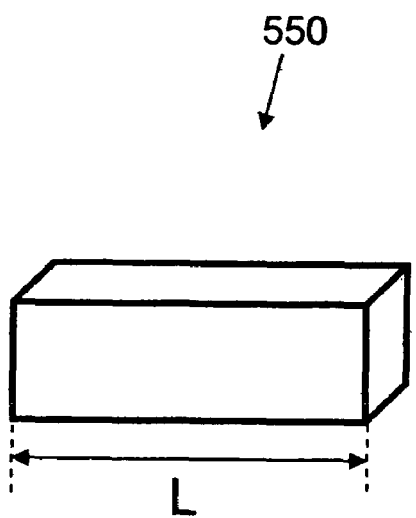
FIGS. 4F-4I show perspective views of straight, triangular, asymmetrical and hexagonal micro-guides.
Figure 4G:
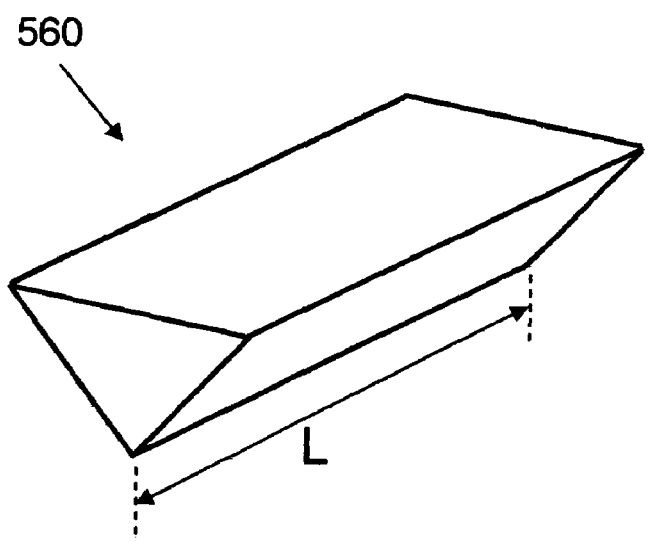
Figure 4H:
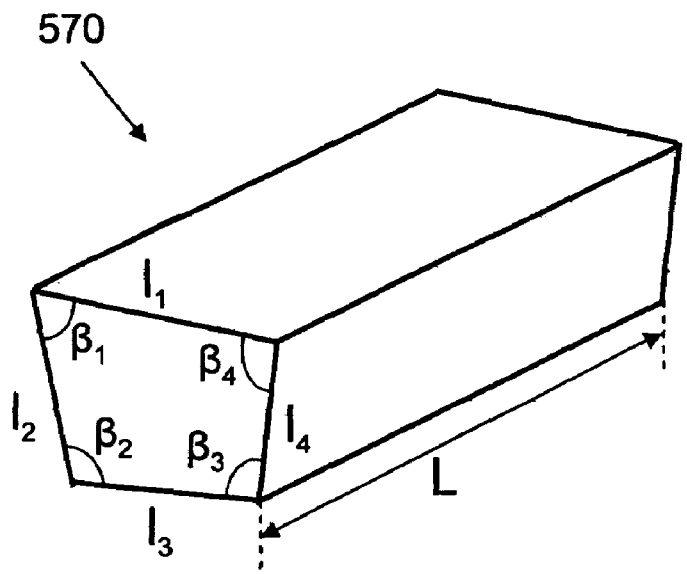
Figure 4I:
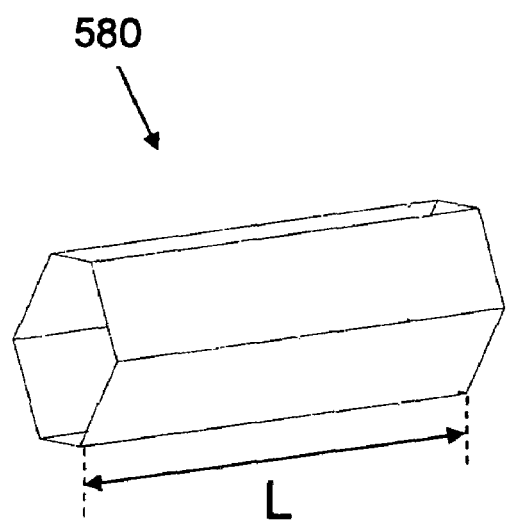

Another exemplary construction of plate 534*a* is shown in FIGS. 4C-4E. FIGS. 4C and 4D show back and front side views of plate 534*a*, respectively. The front side in this case faces the light source. FIG. 4E shows a cross-sectional view of the plate 534*a*, along line D shown in FIGS. 4C-D.

As shown in FIG. 4C, the back side of plate 534*a* has large number (several hundred thousands and up to millions) of micro-guides 1534*a* distributed on its surface except the area corresponding to the input aperture 534*a*1. Micro-guides 1534*a* have square entrance and exit apertures and are purposely not aligned with plate 534*a* axis or the y-axis (which is usually aligned with the reflective polarizer 534*d* axis). When the light reflected by the polarizer 534d enters these micro-guides 1534a its polarization state gets rotated allowing this light or part of it to pass through the polarizer 534d when it strikes the polarizer the second time.

As shown in FIG. 4D, the front side of plate 534a has a clear input aperture 534a1 and a reflective coating 534a2 everywhere else.

Micro-guide 1534a of plate 534a can have square 550, triangular 560, asymmetrical 570 and hexagonal 580 entrance and exit apertures as shown in FIGS. 4F, 4G, 4H and 4I, respectively. Other shapes such as rectangular, circular and irregular shapes are possible. Micro-guides 1534a of different shapes and sizes can be made on a single plate.

Figure 5A:
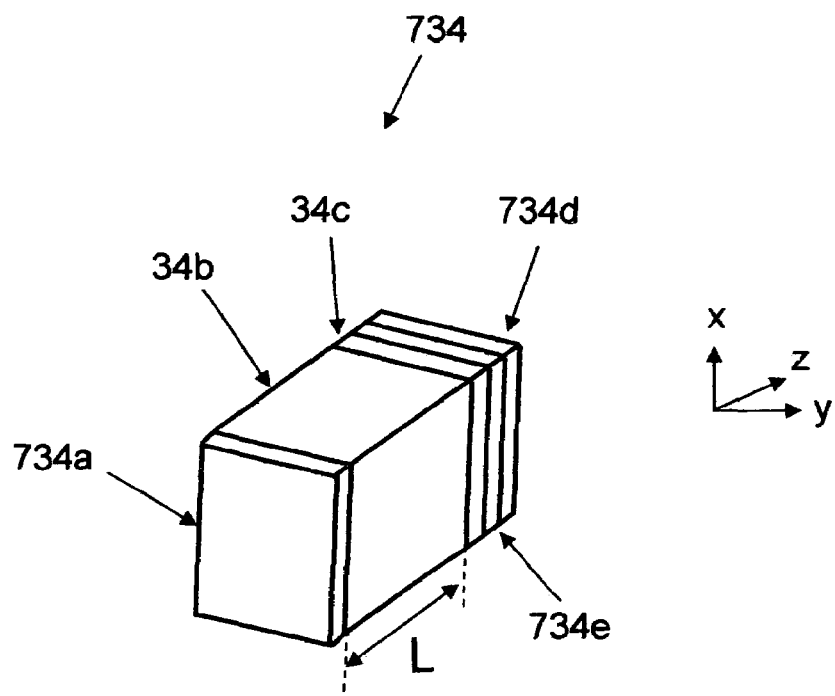
FIGS. 5A-5C show perspective views of three different implementations of a polarization recovery system using a retardation plate.

FIG. 5A illustrates a polarization conversion system 734 in which a quarter-wave plate is used to convert the polarization of recycled light. The system 734 includes the collimating plate 34c, an input plate 734a, a light guide 34b, a collimating plate 34c, quarter wave plate 734e and a reflective polarizer 734d such as a Proflux™ brand from Moxtek company. Plates 34a or 440a of FIGS. 2E-2F and FIGS. 3B-3G, respectively, can be used to perform the function of plate 734a. Light guide 34b and plate 34c have been described above. The quarter wave plate 734e can be placed between plate 734a and light guide 34b or between light guide 34b and plate 34c. In addition, plate 34c can be placed after the reflective polarizer 734d, which has to be always placed beyond the quarter wave plate 734e.

Figure 5B:
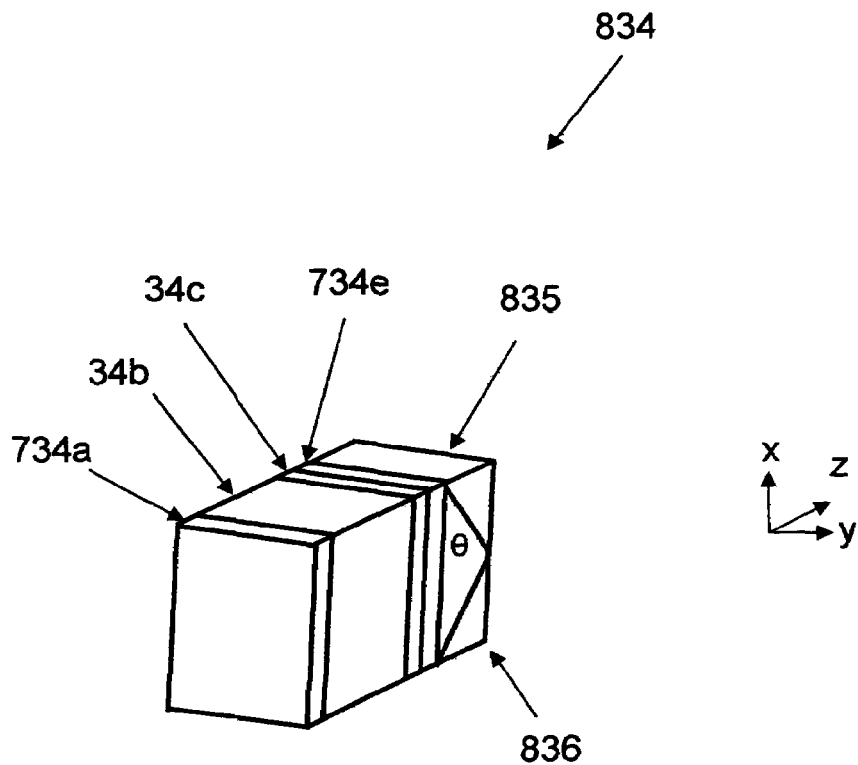
Figure 5C:
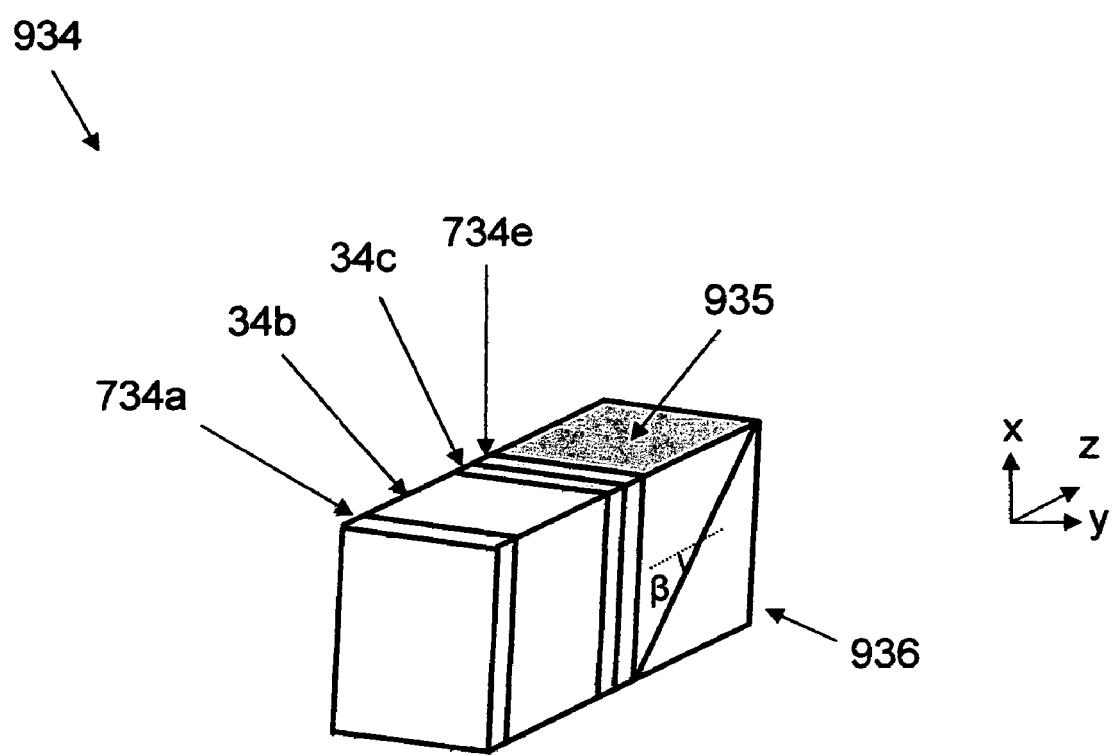

FIGS. 5B and 5C show two polarization conversion systems 834 and 934 similar to that of FIG. 5A except for the replacement of the reflective polarizer 734d by an assembly of two polarization beam splitters 835 and 836 each disposed at an angle θ of 45° to the axis of the light path (FIG. 5B) and an assembly of a mirror 935 with a single polarization beam splitter 936 disposed at an angle β of 45° to the axis of the light path (FIG. 5C). The light path in FIGS. 5A-5C is parallel to the z-axis.

FIGS. 6A-6D show perspective views of four additional polarization conversion systems (PCSs) 1034, 1134, 1234 and 1334 utilizing collimating plate 34c of FIGS. 2G-2I.

Figure 6A:
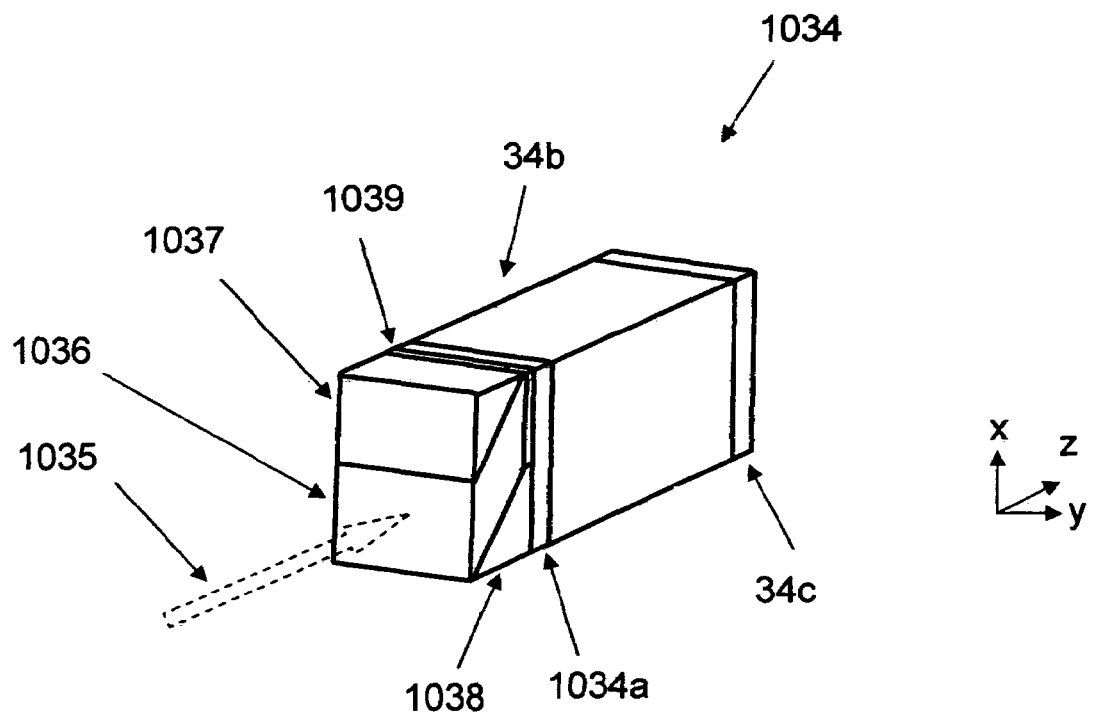
FIGS. 6A-6D show perspective views of four polarization conversion systems utilizing plates of this disclosure.

FIG. 6A shows a polarization conversion system 1034 comprising two polarization beam splitters 1037 and 1038, a rhomb 1036, a half wave plate 1039, a plate 1034a, a light guide 34b and a plate 34c. FIG. 6E shows a perspective view of plate 1034a which has two clear input apertures 1034a1 and 1034a2 and a highly reflective coating 1034a3 else where. Input light 1035 is focused into the second polarization beam splitter cube 1038 as shown in FIG. 6A. Light with one polarization state (e.g., p state) is transmitted to aperture 1034a2 of plate 1034a and light with orthogonal polarization state (e.g., s state) is reflected toward the first polarization beam splitter cube 1037. At the surface of the first polarization beam splitter cube 1037, light with orthogonal polarization state (e.g., s state) is reflected toward the half wave plate 1039 where its polarization state is converted into the orthogonal state (e.g., p state) and enters aperture 1034a1 of plate 1034a.

Figure 6B:
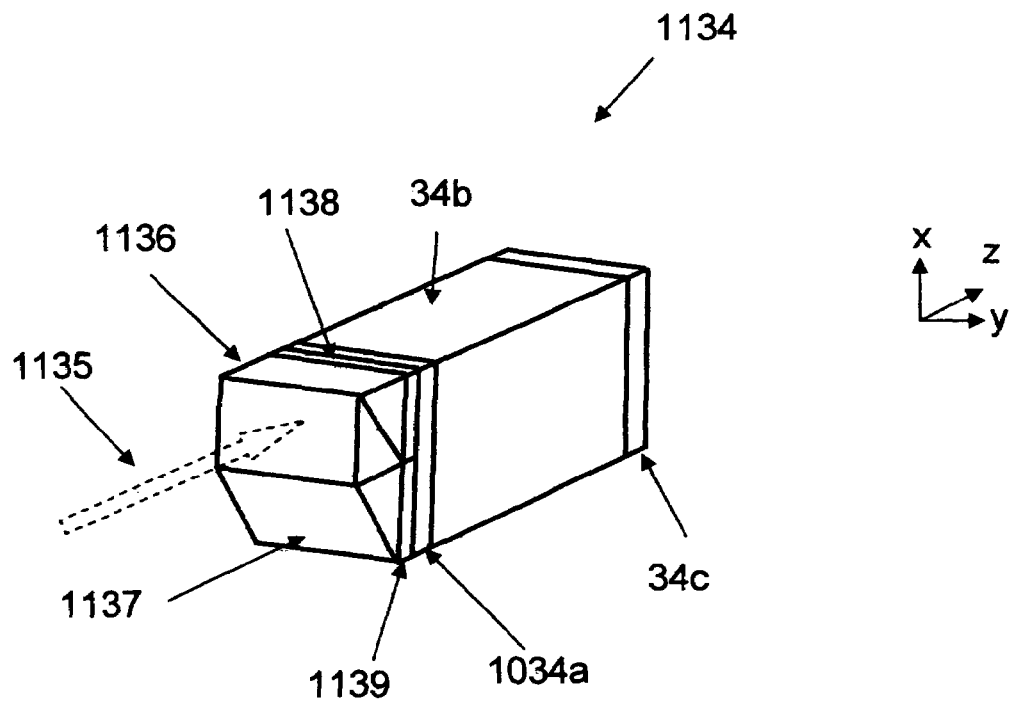

FIG. 6B shows a polarization conversion system 1134, which includes a polarization beam splitter cube 1136, a prism reflector 1137, a half wave plate 1139, spacer 1138, a plate 1034a, a light guide 34b and a plate 34c. Input light 1135 is coupled into the polarization beam splitter cube 1136 as shown in FIG. 6B. Light with one polarization state (e.g., p state) is transmitted to aperture 1034a1 of plate 1034a through a spacer 1138 and light with orthogonal polarization state (e.g., s state) is reflected toward a prism reflector 1137. At the surface of the prism reflector 1137, light with orthogonal polarization state (e.g., s state) is reflected toward the half-wave plate 1139 where its polarization state is converted into the orthogonal state (e.g., p state) and enters aperture 1034a2 of plate 1034a.

Figure 6C:
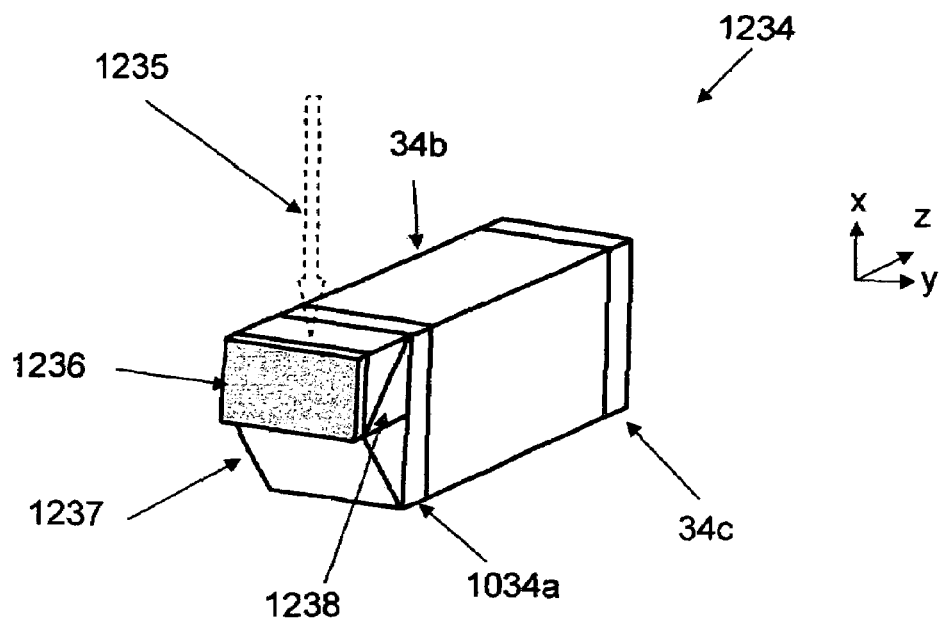
Figure 6D:
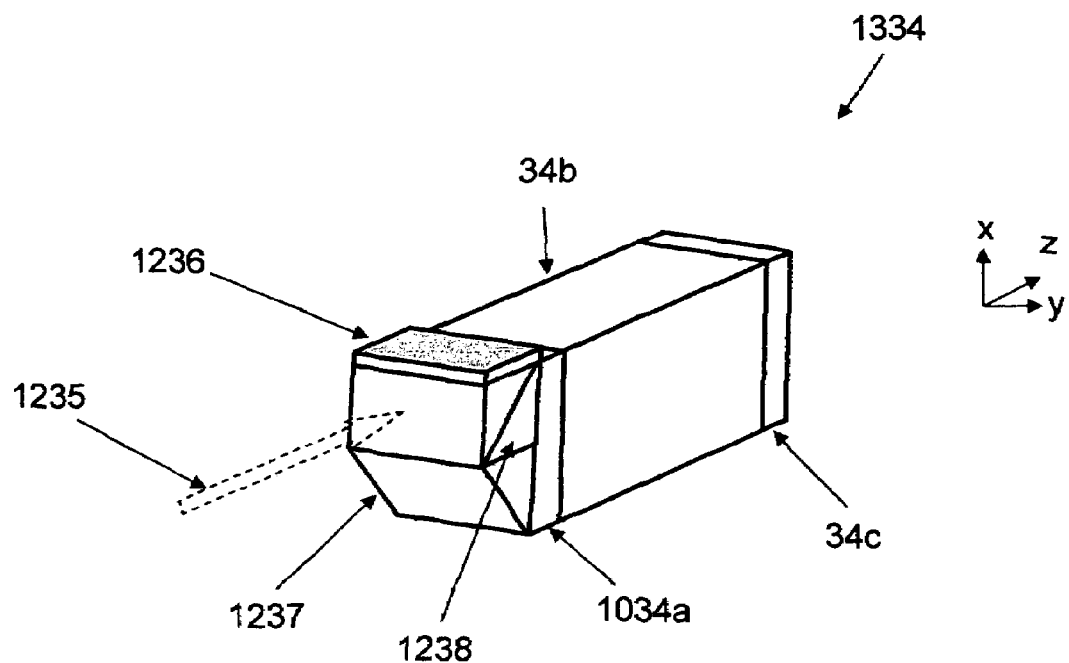
Figure 6E:
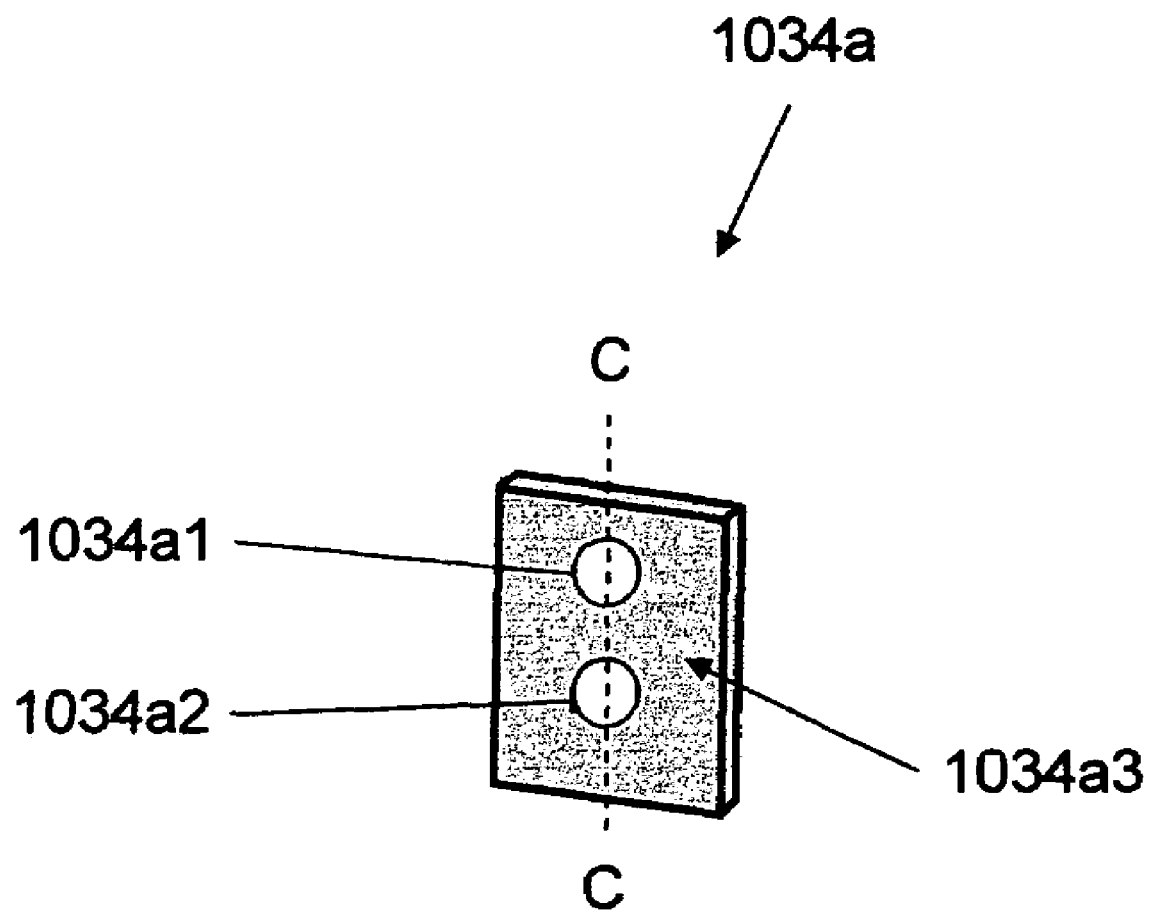
FIG. 6E shows a perspective view of plate 1034a of FIGS. 6A-6D.

FIG. 6C shows a polarization conversion system 1234 which includes a polarization beam splitter cube 1238, a prism reflector 1237, a quarter wave plate with a reflector 1236, a plate 1034a, a light guide 34b and a plate 34c. Input light 1235 is coupled into the polarization beam splitter cube 1238 as shown in FIG. 6C. Light with one polarization state (e.g., p state) is transmitted to the prism reflector 1237, which in turn reflects it toward aperture 1034a2 of plate 1034a. Light with orthogonal polarization state (e.g., s state) is reflected toward the quarter wave plate 1236 where it enters and exits the quarter wave plate 1236 toward aperture 1034a1 of plate 1034a with a converted polarization state (e.g., p state). FIG. 6D shows a polarization conversion system 1334 that has the quarter-wave plate with a reflector 1236.

Polarization conversion systems (PCSs) 1034, 1134, 1234 and 1334 can be implemented using a plate similar to plate 440a of FIGS. 3B-3G but with two clear input apertures rather than one.

Polarization conversion systems (PCSs) 534, 634, 734, 834, 934, 1034, 1134, 1234 and 1334 can be substituted for the light recovery systems 34 and 440 in the projection systems of FIGS. 2A-D whenever liquid crystal based micro-displays are utilized.

The polarization conversion systems (PCSs) 534, 634, 734, 834, 934, 1034, 1134, 1234 and 1334 of this disclosure have five key advantages over known polarization conversion systems First, the polarization conversion systems disclosed herein can use larger input apertures (i.e., larger cross-sectional area of the PCS) while maintaining the etendue of the input light or that of a lamp/reflector. This leads to increasing the efficiency of the polarization conversion system and displays utilizing such PCSs.

Second, the PCSs disclosed herein provide more control over the spatial light distribution and uniformity in terms of intensity and angle when compared to that of known PCSs. The capability of designing and distributing individual micro-elements within an extraction micro-guide array provides control over the spatial distribution of light intensity and cone angle over the exit aperture of a PCS. For example, the PCSs can provide more light at higher angles, thus, overcoming the typical angle dependent loss in a display system and leading to more uniform light intensity at the screen.

Third, the PCSs disclosed herein provide higher coupling efficiency between the light source and the display panels (i.e., modulator) in a display system by the use of collimating elements within a PCS. This results in a more efficient use of light by the light valve, thus, reducing the required number of light sources and/or their power. In this case, collimating micro-guide arrays decrease the etendue of light beam delivered to the light valve, and thus, enhance coupling efficiency and increase display brightness.

Fourth, the PCSs disclosed herein provide a superior level of compactness and light-weight. The length of the PCS can be lower than the length of known PCS by up to one or more orders of magnitude resulting in very compact light-weight display and illumination systems. In addition, the high PCS efficiency enables the use of small size display panels ($\leq 0.5$") which results in using smaller optical components such as the projection lens, thus, leading to very compact projection systems.

Fifth, lower cost is achieved by using the PCSs of this disclosure due to the reduced size of the optical components used within the projection display system. As the size of optical components is reduced, their cost is reduced and the cost of the overall system is reduced.

The light recovery systems 34 and 440 and polarization recovery systems 534, 634, 734, 834, 934, 1034, 1134, 1234 and 1334 described herein can be used to recycle light reflected by a color wheel in single-modulator sequential color display systems.

Antireflection coating (ARC) such as sub-wavelength structures or gratings can be applied to the front and/or back sides of the plates described herein to reduce Fresnel reflections. In addition, it is possible to use micro-tunnel and micro-guide arrays and fabrication techniques described in related patent application Ser. No. 10/458,390 filed on Jun. 10, 2003 to Nayef Abu-Ageel.

The micro-guide arrays disclosed herein can be made using various methods including, but not limited to, dry etch techniques such as reactive ion etch (RIE) technique, wet etch techniques such as the use of fluoride-based aqueous etching of Pyrex™ substrates or the use of buffered oxide etch (BOE) to form micro-elements in fused silica substrates. Additional fabrication techniques can use photosensitive glasses such as Foturan® produced by Schott Glass, Inc. or combine a spin-on glass (SOG) process and standard LIGA techniques. Further techniques include glass-drawing which is commonly used in fabricating micro-channel plates (MCPs), laser patterning techniques, nano-technology techniques and combinations of two or more of the foregoing techniques.

The illumination systems, light recovery systems and PCSs disclosed herein have broad applications, including, but not limited to, projection displays such as projectors, projection TV, digital TV, home theater and monitors; direct-view displays and micro-displays used in gaming consoles, camcorders, cameras, cell phones, internet appliances, and headsets; lithography and photomask generation equipment; laser thermal processing; microscopy; fiber optic illumination; medical instrumentation and portable patient monitoring; GPS/navigation units; indicators on a car's dashboard; barcode scanners and test-and-measurement equipment.

While one or more specific embodiments of the invention have been described above, it will be apparent to those of ordinary skill in the art that many more embodiments are possible that are within the scope of the invention. Further, the foregoing summary, detailed description and drawings are considered as illustrative only of the principles of the invention. Since other modifications and changes may be or become apparent to those skilled in the art, the invention is not limited the exact constructions and operations shown and described above, and accordingly, all suitable modifications and equivalents are deemed to fall within the scope of the invention, the invention being defined by the claims that follow.

The invention claimed is:

1. An illumination system for use in optical display systems, comprising:
    a light guide having two ends;
    a reflective plate mated to one end of the light guide, the reflective plate having a reflective surface with a transparent aperture formed therein for admitting input light from a light source into the light guide; and
    a micro-guide plate mated to the other end of the light guide, the micro-guide plate including one or more optical elements formed and positioned in a predetermined arrangement on at least one surface of the micro-guide plate for altering at least one optical characteristic of the input light, wherein the micro-guide plate includes:
        a first plate mated to the light guide, the first plate having a reflective surface with a plurality of transparent apertures formed therein; and
        a second plate including the optical elements, each of the optical elements being mated to one of the apertures in the reflective surface.

2. The illumination system of claim 1, further comprising a reflective coating applied to sidewalls of the optical elements.

3. The illumination system of claim 1, wherein the optical elements are placed in a predetermined arrangement to compensate for optical aberrations selected from the group consisting of Keystone distortion, illumination overfill, illumination drop-off and any combination of the foregoing.

4. The illumination system of claim 1, wherein the micro-guide plate includes at least one million optical elements.

5. The illumination system of claim 1, wherein optical elements include optical elements selected from the group consisting of apertures in a reflective coating, micro-guides, light guides, tunnels, lenses, prisms and any suitable combination of the foregoing optical elements.

6. The illumination system of claim 1, further comprising a reflective coating covering surface area of the micro-guide plate between adjacent optical elements.

7. The illumination system of claim 1, further comprising a polarizing unit at the exit face of the micro-guide plate, wherein the polarizing unit passes light with a predetermined polarization state and reflects the remaining light back toward the light guide.

8. The illumination system of claim 7, wherein the polarizing unit comprises a reflective polarizer, two polarization beam splitters, or a mirror and a polarization beam splitter.

9. The illumination system of claim 1, further comprising a quarter-wave plate and a polarizing unit;
    wherein the polarizing unit is located at the exit face of the system and passes light with a predetermined polarization state and reflects the remaining light back toward the light guide; and
    wherein the quarter-wave plate is located after the exit face of the reflective plate and before the entrance face of the polarizing unit.

10. The illumination system of claim 9, wherein the polarizing unit comprises a reflective polarizer, two polarization beam splitters, or a mirror and a polarization beam splitter.

11. The illumination system of claim 1, wherein the reflective plate comprises at least one optical element formed and positioned in a predetermined arrangement on at least one surface of the reflective plate.

12. An illumination system for use in optical display systems, comprising:
   a light guide having two ends;
   a reflective plate mated to one end of the light guide, the reflective plate having a reflective surface with a transparent aperture formed therein for admitting input light from a light source into the light guide; and
   a micro-guide plate mated to the other end of the light guide, the micro-guide plate including one or more optical elements formed and positioned in a predetermined arrangement on at least one surface of the micro-guide plate for altering at least one optical characteristic of the input light, wherein each of the optical elements of the micro-guide plate comprises an entrance aperture, an exit aperture away from and parallel to the entrance aperture, at least one sidewall connecting the entrance and exit apertures and a reflective coating on the at least one sidewall.

13. The illumination system of claim 12, wherein the optical elements include at least one hollow micro-guide comprising an entrance aperture, an exit aperture away from and parallel to the entrance aperture, at least one sidewall connecting the entrance and exit apertures and a reflective coating on the at least one sidewall.

14. The illumination system of claim 12, further comprising a reflective coating covering surface area of the micro-guide plate between adjacent optical elements.

15. The illumination system of claim 12, further comprising a polarizing unit at the exit face of the micro-guide plate, wherein the polarizing unit passes light with a predetermined polarization state and reflects the remaining light back toward the light guide.

16. The illumination system of claim 15, wherein the polarizing unit comprises a reflective polarizer, two polarization beam splitters, or a mirror and a polarization beam splitter.

17. The illumination system of claim 12, further comprising a quarter-wave plate and a polarizing unit;
   wherein the polarizing unit is located at the exit face of the system and passes light with a predetermined polarization state and reflects the remaining light back toward the light guide; and
   wherein the quarter-wave plate is located after the exit face of the reflective plate and before the entrance face of the polarizing unit.

18. The illumination system of claim 17, wherein the polarizing unit comprises a reflective polarizer, two polarization beam splitters, or a mirror and a polarization beam splitter.

19. A method of operating an illumination system, comprising:
   receiving input light at a reflective plate mated to one end of a light guide, the reflective plate having a reflective surface with a transparent aperture formed therein;
   admitting a portion of the input light through the transparent aperture into the light guide;
   outputting the admitted input light from an exit end of the light guide into a micro-guide plate having a plurality of optical elements formed and positioned in a predetermined arrangement on at least one surface of the micro-guide plate, wherein each of the optical elements of the micro-guide plate comprises an entrance aperture, an exit aperture away from and parallel to the entrance aperture, at least one sidewall connecting the entrance and exit apertures and a reflective coating on the at least one sidewall; and
   the optical elements altering at least one optical characteristic of the light output from the light guide.

20. The method of claim 19, further comprising:
   blocking a portion of the light output from the light guide with a reflective coating applied to a surface of the micro-guide plate.

* * * * *